US009197858B2

(12) United States Patent
McCoy et al.

(10) Patent No.: US 9,197,858 B2
(45) Date of Patent: Nov. 24, 2015

(54) SYSTEM AND METHOD FOR DISTRIBUTING AND BROADCASTING MULTIMEDIA

(75) Inventors: Robert H. McCoy, Broken Arrow, OK (US); Edward R. Andes, Broken Arrow, OK (US); David M. Berezowski, Tulsa, OK (US); Bruce A. Blackwell, Broken Arrow, OK (US); Franklin E. Boyer, Cleveland, OK (US); Jon R. Braunsma, Jenks, OK (US); James T. Buckley, Tulsa, OK (US); Eric Cockrell, Broken Arrow, OK (US); Timothy B. Demers, Tulsa, OK (US); Harlan Ford, Tulsa, OK (US); Donald C. Kern, Broken Arrow, OK (US); Pamela S. Klich, Tulsa, OK (US); Terry J. Kroh, Tulsa, OK (US); Randall C. Lievsay, Sapulpa, OK (US); Douglas E. Naufel, Broken Arrow, OK (US); Steven P. Reiser, Broken Arrow, OK (US); Alan K. Roper, Tulsa, OK (US); Ronald R. Russell, Tulsa, OK (US); Robert A. Wallis, Tulsa, OK (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 13/406,657

(22) Filed: Feb. 28, 2012

(65) Prior Publication Data

US 2012/0240149 A1 Sep. 20, 2012

Related U.S. Application Data

(63) Continuation of application No. 10/322,915, filed on Dec. 17, 2002, now Pat. No. 8,151,297, which is a continuation of application No. 08/779,713, filed on Jan. 7, 1997, now Pat. No. 6,526,575.

(51) Int. Cl.
*H04N 7/10* (2006.01)
*H04N 7/173* (2011.01)

(52) U.S. Cl.
CPC ............................. *H04N 7/17318* (2013.01)

(58) Field of Classification Search
CPC .................................................. H04N 21/812
USPC ............................................................ 725/32
See application file for complete search history.

(56) References Cited

U.S. PATENT DOCUMENTS

| 3,729,581 A | 4/1973 | Anderson |
| 4,058,830 A | 11/1977 | Guinet et al. |

(Continued)

FOREIGN PATENT DOCUMENTS

| EP | 0 595 354 | 5/1994 |
| EP | 0 624 039 | 11/1994 |

(Continued)

OTHER PUBLICATIONS

Miller, "A Scenario for the Development of Interactive Multimedia Cable Television Systems in the United States in the 1990's," Proceedings of the IEEE, 82:585-89 (1994).

*Primary Examiner* — Nathan Flynn
*Assistant Examiner* — Alfonso Castro
(74) *Attorney, Agent, or Firm* — Ropes & Gray LLP

(57) ABSTRACT

Multimedia distribution and broadcast systems and related processes are provided for transmitting multimedia contents and control information from a central uplink facility to a remote downlink via a satellite. The system is preferably implemented in order to generate sequences of multimedia that are broadcast from the remote downlink facility to viewers. The display arrangements of the multimedia sequences are varied and customized by each downlink facility using the control information in order to better inform and entertain viewers.

26 Claims, 32 Drawing Sheets

(56) References Cited

U.S. PATENT DOCUMENTS

| | | | |
|---|---|---|---|
| 4,115,662 | A | 9/1978 | Guinet et al. |
| 4,130,801 | A | 12/1978 | Prygoff |
| 4,602,279 | A | 7/1986 | Freeman |
| 4,625,235 | A | 11/1986 | Watson |
| 4,638,359 | A | 1/1987 | Watson |
| 4,685,131 | A | 8/1987 | Horne |
| 4,691,351 | A | 9/1987 | Hayashi et al. |
| 4,694,490 | A | 9/1987 | Harvey et al. |
| 4,695,880 | A | 9/1987 | Johnson et al. |
| 4,706,121 | A | 11/1987 | Young |
| 4,720,873 | A | 1/1988 | Goodman et al. |
| 4,734,764 | A | 3/1988 | Pocock et al. |
| 4,751,578 | A | 6/1988 | Reiter et al. |
| 4,755,872 | A | 7/1988 | Bestler et al. |
| 4,941,040 | A | 7/1990 | Pocock et al. |
| 4,965,825 | A | 10/1990 | Harvey et al. |
| 4,977,455 | A | 12/1990 | Young |
| 5,027,400 | A | 6/1991 | Baji et al. |
| 5,029,014 | A | 7/1991 | Lindstrom |
| 5,038,211 | A | 8/1991 | Hallenbeck |
| RE33,808 | E | 1/1992 | Wright, Jr. |
| 5,093,718 | A | 3/1992 | Hoarty et al. |
| 5,099,319 | A | 3/1992 | Esch et al. |
| 5,099,422 | A | 3/1992 | Foresman et al. |
| 5,119,188 | A | 6/1992 | McCalley et al. |
| 5,132,992 | A | 7/1992 | Yurt et al. |
| 5,133,081 | A | 7/1992 | Mayo |
| 5,151,782 | A | 9/1992 | Ferraro |
| 5,155,591 | A | 10/1992 | Wachob |
| 5,172,413 | A | 12/1992 | Bradley et al. |
| 5,182,640 | A | 1/1993 | Takano |
| 5,195,134 | A | 3/1993 | Inoue |
| 5,210,611 | A | 5/1993 | Yee et al. |
| 5,216,515 | A | 6/1993 | Steele et al. |
| 5,220,420 | A | 6/1993 | Hoarty et al. |
| 5,231,494 | A | 7/1993 | Wachob |
| 5,283,639 | A | 2/1994 | Esch et al. |
| 5,285,272 | A | 2/1994 | Bradley et al. |
| 5,311,423 | A | 5/1994 | Clark |
| 5,317,391 | A | 5/1994 | Banker et al. |
| 5,318,450 | A | 6/1994 | Carver |
| 5,319,455 | A | 6/1994 | Hoarty et al. |
| 5,345,594 | A | 9/1994 | Tsuda |
| 5,359,601 | A | 10/1994 | Wasilewski et al. |
| 5,367,330 | A | 11/1994 | Haave et al. |
| 5,392,066 | A | 2/1995 | Fisher et al. |
| 5,400,401 | A | 3/1995 | Wasilewski et al. |
| 5,410,344 | A * | 4/1995 | Graves et al. ................... 725/46 |
| 5,412,416 | A | 5/1995 | Nemirofsky |
| 5,418,782 | A | 5/1995 | Wasilewski |
| 5,424,770 | A | 6/1995 | Schmelzer et al. |
| 5,446,919 | A | 8/1995 | Wilkins |
| 5,465,385 | A | 11/1995 | Ohga et al. |
| 5,485,221 | A | 1/1996 | Banker et al. |
| 5,499,046 | A | 3/1996 | Schiller et al. |
| 5,515,098 | A | 5/1996 | Carles et al. |
| 5,521,631 | A | 5/1996 | Budow |
| 5,523,796 | A | 6/1996 | Marshall et al. |
| 5,544,354 | A | 8/1996 | May et al. |
| 5,559,548 | A * | 9/1996 | Davis et al. .................... 725/40 |
| 5,559,549 | A * | 9/1996 | Hendricks et al. .............. 725/50 |
| 5,635,978 | A | 6/1997 | Alten et al. |
| 5,652,615 | A | 7/1997 | Bryand et al. |
| 5,659,350 | A | 8/1997 | Hendricks et al. |
| 5,682,195 | A * | 10/1997 | Hendricks et al. .............. 725/31 |
| 5,761,601 | A * | 6/1998 | Nemirofsky et al. ........... 725/34 |
| 5,781,245 | A | 7/1998 | Van Der Weij, Jr. et al. |
| 5,798,785 | A * | 8/1998 | Hendricks et al. .............. 725/46 |
| 5,848,352 | A | 12/1998 | Dougherty et al. |
| 5,945,987 | A * | 8/1999 | Dunn ........................... 715/718 |
| 6,160,989 | A | 12/2000 | Hendricks et al. |
| 6,201,536 | B1 * | 3/2001 | Hendricks et al. ........... 715/716 |
| 6,335,737 | B1 | 1/2002 | Grossman et al. |
| 6,526,575 | B1 | 2/2003 | McCoy et al. |
| 8,151,297 | B2 | 4/2012 | McCoy et al. |
| 2003/0088873 | A1 | 5/2003 | McCoy et al. |
| 2005/0157217 | A1 * | 7/2005 | Hendricks ..................... 348/734 |

FOREIGN PATENT DOCUMENTS

| | | |
|---|---|---|
| FR | 2 733 870 | 11/1996 |
| WO | WO 93/11635 | 6/1993 |
| WO | WO 95/04431 | 2/1995 |
| WO | WO 96/08113 | 3/1996 |
| WO | WO 96/37996 | 11/1996 |

\* cited by examiner

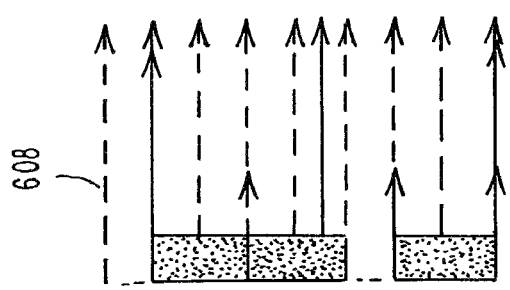
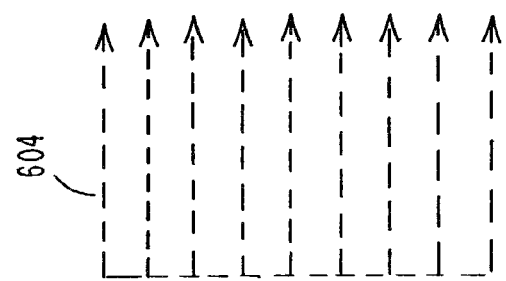
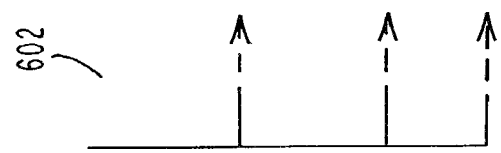
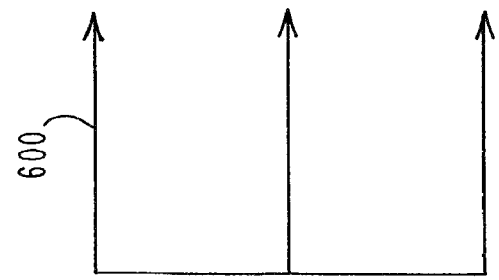
FIG. 18

| PROMOTIONAL TYPE | LENGTH | STARTS AT |
|---|---|---|
| UP NEXT MM CYCLE | 0:50 | 0:50 |
| TITLE BB | 0:30 | 0:50:50 |
| UP NEXT REELTALK | 1:00 | 0:51:20 |
| 2HR PROMO | 0:30 | 0:52:20 |
| 2HR PROMO | 0:15 | 0:52:50 |
| 2HR PROMO | 0:30 | 0:53:05 |
| INTERRUPT | 0:30 | 0:53:35 |
| LOCAL AD | 2:30 | 0:54:05 |
| NAT'L AD | 1:00 | 0:56:35 |
| SBE | 0:30 | 0:57:35 |
| 2HR PROMO | 0:30 | 0:58:05 |
| ADULT POD | 0:30 | 0:58:35 |
| 2HR PROMO | 0:15 | 0:59:05 |
| INTERRUPT | 0:30 | 0:59:20 |
| NAT'L AD | 0:50 | 0:59:50 |
| LOCAL AD | 0:30 | 1:00:40 |
| SBED | 1:00 | 1:01:10 |
| 2HR PROMO | 0:15 | 1:02:10 |
| 2HR PROMO | 0:30 | 1:02:25 |
| LOCAL AD | 0:30 | 1:02:55 |
| INTERRUPT | 0:30 | 1:03:25 |
| ADULT POD | 2:00 | 1:03:55 |
| TITLE BB | 0:30 | 1:05:55 |

FIG. 19

SYSTEM AND METHOD FOR DISTRIBUTING AND BROADCASTING MULTIMEDIA

CROSS REFERENCE TO RELATED APPLICATIONS

This is a continuation of U.S. patent application Ser. No. 10/322,915, filed Dec. 17, 2002, now U.S. Pat. No. 8,151,297, which is a continuation of U.S. patent application Ser. No. 08/779,713, filed Jan. 7, 1997, now U.S. Pat. No. 6,526,575.

BACKGROUND OF THE INVENTION

The present invention relates generally to multimedia distribution and broadcast systems, and particularly systems capable of transmitting multimedia and media control information in analog or digital form from a central uplink facility to remotely located broadcast headend facilities via a satellite or other data distribution systems. More particularly, this invention relates to multimedia distribution and broadcast systems capable of generating sequences of customized multimedia presentations that would be broadcast based on the transmitted multimedia and media control information.

In response to need for distributing multimedia from a global source to geographically dispersed broadcasting facilities multimedia distribution and broadcast systems using satellites have become available to provide efficient and reliable delivery of multimedia. Satellite communication utilizes a line-of-sight microwave relay in orbit high above the earth so as to cover large areas of the earth's surface. Satellite communication is particularly well suited for multiple-point communications. Satellite communication thus provides a cost-effective way to distribute multimedia to headend facilities spread throughout the country because satellite receivers can be installed at the broadcasting facilities without the high investment cost of terrestrial connections.

The multimedia distributed via such satellite communication links, for example, include video clips of pay-per-view movies or sporting events that can be broadcast by multiple cable operators to their cable subscribers. Needless to say, these multimedia distribution systems are welcomed by the cable operators because such services save the cable operators from technical responsibilities for producing and maintaining various multimedia to be broadcast to subscribers. The multimedia distribution and broadcast systems may also add entertainment and informational value to cable systems while increasing cable operators' revenues from premium services and pay-per-view events.

One concern of cable operators is that cable television subscribers have begun to seek more sophisticated screen displays as they are exposed to the more advanced multimedia presentations of personal computers. Television viewers therefore seek similar display formats for their televisions that would provide more information and better entertainment.

Another concern is that cable operators seek more sophisticated scheduling capabilities for promotions in order to maximize returns from their advertisements by positioning certain types of advertisements at particular times of the day to reach certain types of cable subscribers.

For example, cable operators generally prefer to increase the frequencies of promotions for events that are to be broadcast in the near future. Cable operators also generally try to broadcast the promotions at the most effective times to promote special/premium events (e.g., during prime time viewing hours).

Yet another concern of cable operators is that cable headend facilities have limited ways to input their preferences that determine the types of promotions to be broadcast to their particular subscribers. As cable systems become more focused on providing tailored programs for particular cable television subscribers, the cable operators desire to reflect their priorities and choices into the scheduling or display of promotions.

Still another concern is that the quality and variety of broadcast programming at the broadcasting facilities are limited by the extent of the multimedia received via a satellite. Therefore, cable operators not only desire the most efficient use of the satellite transmission, but also the most effective use of the transmitted multimedia.

Attempts have been made to provide multimedia distribution systems employing satellite communications. One system described in U.S. Pat. No. 5,216,515 provides for the overnight delivery of advertising messages to cable headends. The system allows automated and customized insertion of advertisements on multiple cable channels. However, the system is not capable of providing capability to distribute multimedia and utilize the same multimedia in various ways.

One commercially available promotion service, known as Sneak Prevue is a promotion distribution and broadcast system. The Sneak Prevue based on tapes has its video promotion transmitted over the satellite in the wee hours in the morning from the uplink to the downlink. A system called a character generator located at the downlink screens such transmitted video promotions and records only pertinent portions. The Sneak Prevue based on laser discs uses laser discs to deliver video information and, thus, has random ability to interrupt the normal play, for example, with the promotions for upcoming events. In either of the Sneak Prevue systems, the cable headend connected to the satellite downlink broadcasts to cable subscribers promotional videos overlaid with local information.

Although Sneak Prevue has been widely accepted by cable operators and cable subscribers, the service has certain limitations. For example, Sneak Preview has limited capability to present multimedia in various presentation formats.

Thus, it would be desirable to provide multimedia distribution and broadcast systems and related processes in which the multimedia presentations can be improved by providing diverse display arrangements and add entertainment and information values. It would also be desirable that such display arrangements allow efficient utilization of a limited set of multimedia without burdening the distribution process.

SUMMARY OF THE INVENTION

In accordance with this invention, multimedia distribution and broadcast systems and related processes are provided which can generate sequences of customized multimedia that can be broadcast to viewers. The multimedia distribution and broadcast system comprises a central uplink facility and remote downlink facilities. Each downlink facility may be further connected with, for example, cable television subscribers via cable connections. The central uplink facility is capable of transmitting multimedia contents and control data in either digital or analog form to the remote downlink facilities, for example, via a satellite. The multimedia contents and control data used in connection with the present invention are structured so that each downlink facility may generate multimedia sequences to be broadcast in customized display arrangements. The cable headend facilities, for example, produce promotional programs from the received multimedia and broadcast the promotional programs to their cable television subscribers. The properties of multimedia elements are used for linking different multimedia elements in order to generate multimedia sequences Using the same set of multimedia, multimedia distribution and broadcast systems and related processes allow creation of several different display arrangements. The multimedia sequences in various display arrangements increase entertainment and information values of the multimedia sequences to be broadcast to viewers. The multimedia distribution and broadcast systems and processes of the present invention utilize predefined display arrangements called notebooks. The notebooks consist of sequences of one or more display pages where each display page has its own video, audio, background, text and other multimedia elements to be displayed for a particular period of time. The display page of the notebooks may allow multiple videos to be displayed simultaneously. For example, a display page may have multiple windows on a single screen where each window displays a different video clip. The notebooks may also provide a display having windows with different sizes. The size of a window may be predetermined in a display page so that the overlay does not obstruct a view of information presented in the video. The notebooks are created at the central uplink facility and transferred to the remote downlink facility as media control information so as to relieve the downlink facilities from labor-intensive creation of various display formats.

The multimedia distribution and broadcast systems and processes of the present invention also provide a scheduling method that facilitates effective and customized scheduling at the remote downlink facilities. The scheduling may reflect the preferences of the cable operators located at downlink facilities for particular categories, titles and frequencies of multimedia.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which:

FIG. 18 is an illustration of a scheduling process of the multimedia distribution and broadcast system of the present invention to create an implicit schedule;

FIG. 19 depicts an exemplary implicit schedule generated by the process illustrated in FIG. 18;

DETAILED DESCRIPTION OF THE PREFERRED EMBODIMENTS

Figure 1:
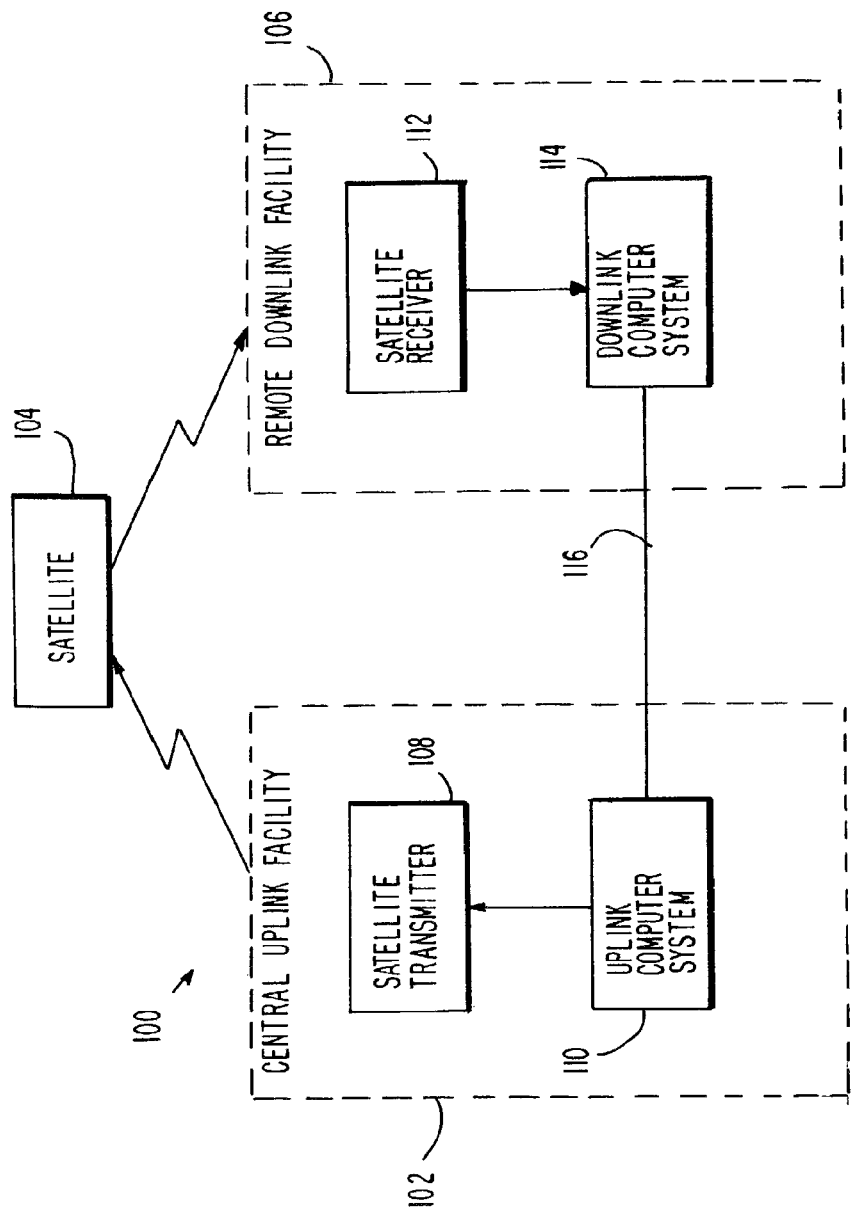
FIG. 1 is a block diagram of a multimedia distribution and broadcast system of the present invention.

A multimedia distribution and broadcast system 100 in accordance with the invention is shown in FIG. 1. The multimedia distribution and broadcast system 100 includes a central uplink facility 102, a satellite 104 and at least one remote downlink facility 106. The central uplink facility 102 distributes multimedia contents and control information to at least one multiple downlink facility 106 via the satellite 104. The remote downlink facility 106 may use the received multimedia and control information to generate multimedia sequences to broadcast to viewers. For example, the remote downlink facility 106 may be further connected to multiple cable television viewers who subscribe to the remote downlink facility's cable television service. It should be understood, however, that although the invention is described in the context of a conventional cable television system, the principles described herein also apply to other broadcasting systems that are suitable for providing multimedia presentation to viewers or data transmission systems. Also, it should be understood that although the invention is described in the context of promotional video distribution and broadcast, the principles described herein apply to other types of multimedia distribution and broadcast. It should be also noted that the present invention may utilize data distribution systems other than a satellite.

The central uplink facility 102 includes a satellite transmitter 108 and an uplink computer system 110. The uplink computer 110 collects the multimedia contents such as video (including transitional video, animation and graphical effects), audio, text and other multimedia elements. The received multimedia contents are typically converted by the uplink computer 110 to be broadcast compatible. The uplink computer system 110 also collects the control information. Some control information is general to all remote downlink facilities such as a television program's title, telecast time (e.g., HBO schedules), program description, theme and channel. Other control information is more specific to the remote downlink facilities such as the information about, a broadcasting format of a particular remote downlink facility 106. Both multimedia contents and control information, are entered at the uplink computer system 110 by manual data entry (e.g., a keyboard) or provided from outside sources via magnetic or optical storage (e.g., tape, disk or CD ROM), modem link or any other suitable medium. The uplink computer 110 consists of at least one server such as the "PROLIANT 4500" manufactured by COMPAQ located in Houston, Tex.

The central uplink facility 102 transmits the multimedia contents and appropriate control information to the remote downlink facility 106 via the satellite 104 from the satellite transmitter 108. The satellite transmitter 108 may be a digital transmitter such as the "701" manufactured by COMSTREAM located in San Diego, Calif.

The remote downlink facility 106 includes a satellite receiver 106 and downlink computer system 114. The remote downlink facility 106 receives the multimedia contents and control information from the uplink facility 102 via the satellite 104 at the satellite receiver 112. The satellite receiver passes the received signals to the remote downlink computer 114. The satellite receiver 112 may be a digital receiver such as the "INTELLICAST 80" manufactured by COMSTREAM located in San Diego, Calif.

The downlink computer system 114 generates' sequences of multimedia to be broadcast, for example, to cable subscribers from these signals containing the multimedia contents and control information. These sequences generally include video that is overlaid by explanatory text and accompanied by audio. The downlink computer system 114 consists of at least one server such as the "VIDEO SERVER 100" manufactured by SEA CHANGE located in Manard, Mass.

As mentioned above, the satellite transmitter 104 transmits the multimedia contents and control information from the central uplink facility 102 to the remote downlink facility 106. However, each remote downlink facility 106 is not likely to want to waste resources by storing the multimedia contents and control information that do not pertain to itself. Therefore, one function performed by the downlink computer system 114 is to select only the relevant and necessary portion of the transmitted data and discard the rest. Each remote downlink facility 106 thus receives and stores, for example, only the schedules and videos that will be used by that particular remote downlink facility 106. Another function of the downlink computer system 114 is detecting an error in the satellite transmission and requesting the uplink computer system 110 to retransmit via a network connection or a communication link 116 such as a telephone link.

Figure 2:
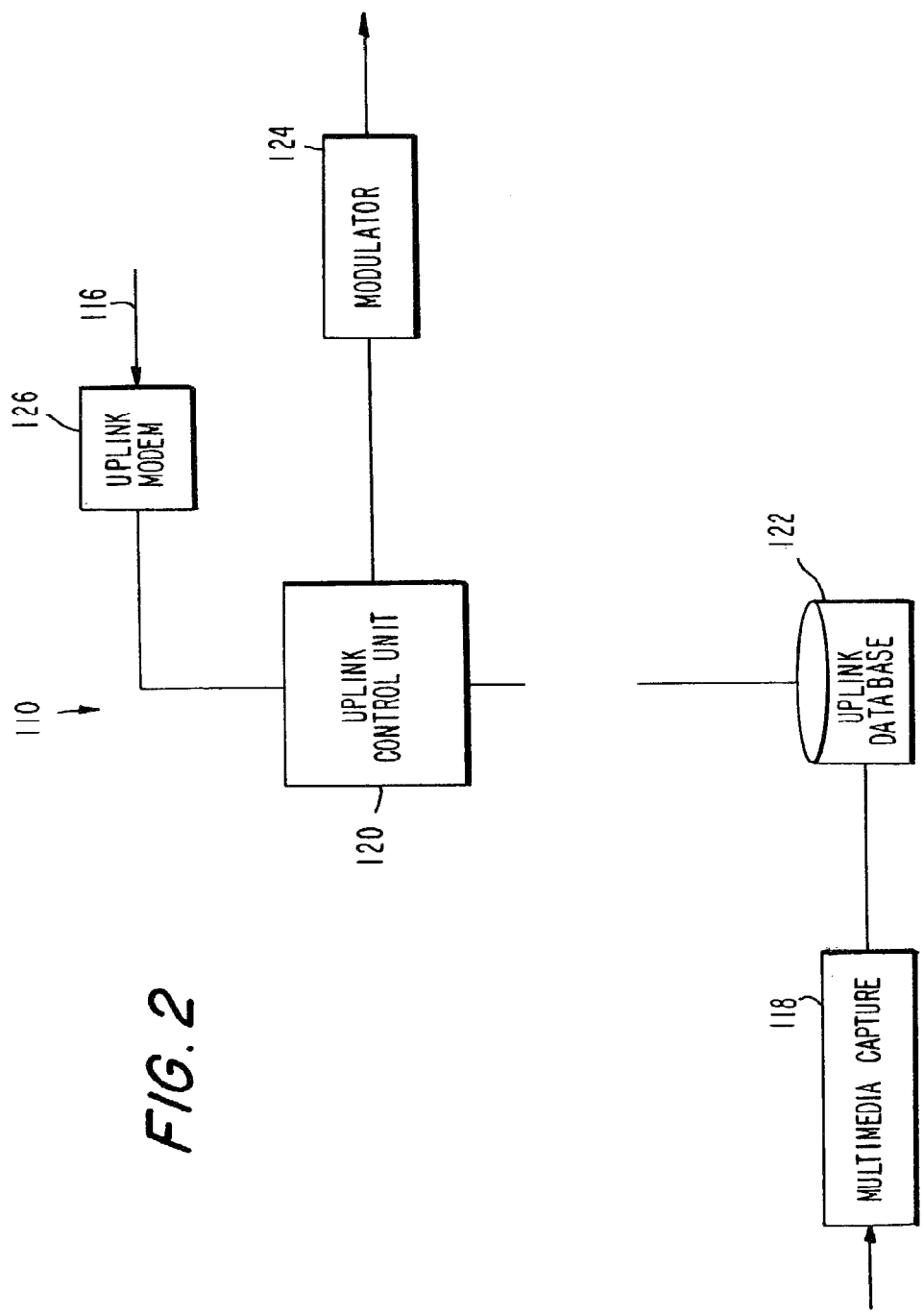
FIG. 2 is a block diagram of a central uplink facility suitable for implementing the multimedia distribution and broadcast system of the present invention.

Turning now to FIG. 2, the uplink computer system 110 suitable for implementing the multimedia distribution and broadcast system 100 of the present invention is described in greater detail. The uplink computer system 110 includes a multimedia capture unit 118, uplink control unit 120, uplink database 122, modulator 124 and uplink modem 126. Various multimedia contents from outside sources are taken as inputs to the multimedia capture unit 118 and converted to digital data with an appropriate broadcasting format for later broadcasts. The multimedia capture unit 118 may be the "VELA ENCODER" or "VELA CENTAUR" manufactured by VELA RESEARCH located in St. Petersburg, Fla.

The uplink control unit 120 stores the encoded data in the uplink database 122. The uplink database 122 provides a file storage for storing various multimedia contents such as video, audio and text as well as control information in a digital format. The uplink database 122 may include a CD ROM player, such as the "JUKEBOX" available from SONY located in Tokyo, Japan, for storing or accessing a desired video portion in a random order. The multimedia contents include various video clips of the promotions, for example, pay-per-view movies and sporting events. The uplink database 122 may also include magnetic or optical storage, which stores various audio clips designed to accompany appropriate video clips. The audio clips may have ties to the actual promotion events or the data other than video clips so that the audio clips can be independently played without video. The uplink database 122 may further include an appropriate storage device for text. The text information includes, for example, titles and prices of pay-per-view movies, names of actors or actresses, pay-per-view event descriptions, movie categories, national and local advertisements, movie ratings, order telephone numbers, order instructions, channel numbers or various other information that can be used in conjunction with video and audio clips to construct promotional multimedia sequences. The structure and contents of the uplink database 122 are described in greater detail herein below in reference to FIGS. 4-8.

The uplink control unit 120 selects the multimedia contents and control information appropriate for transmission to the remote downlink facility 106. The uplink control unit 120 also synchronizes selected video, audio and text in preparation for a satellite transmission. The packaged components are subsequently modulated for transmission at the modulator 124 and passed to the satellite transmitter 108 (FIG. 1) where they are transmitted.

The uplink modem 126 forms a control feedback system that initiates a retransmission if data is lost in the satellite transmission. The uplink modem 126 is connected to the remote downlink facility 106 (FIG. 1) via a landline connection 116 of a regular telephone network which enables inexpensive feedback controls.

Figure 3:
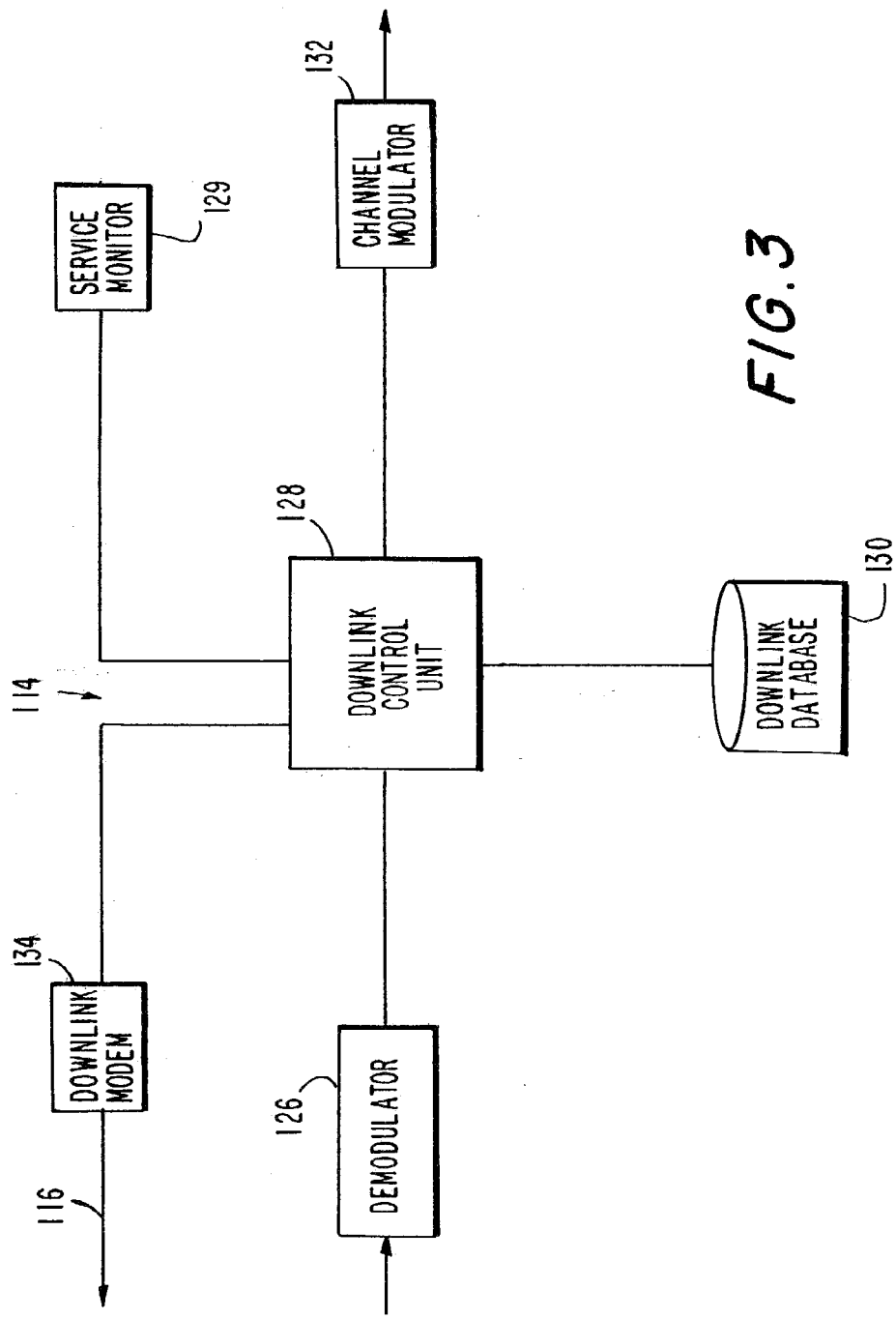
FIG. 3 is a block diagram of a remote downlink facility suitable for implementing the multimedia distribution and broadcast of the present invention.

Turning now to FIG. 3, the cable headend computer 114 (FIG. 1) suitable for implementing the multimedia distribution and broadcast system 100 of the present invention is described in greater detail. The cable headend computer 114 (FIG. 1) includes a demodulator 126, downlink control unit 128, downlink database 130, channel modulator 132 and downlink modem 134. The cable headend computer (FIG. 1) may also contain a service monitor 129 for reporting its activities to an operator. The transmitted signals having the multimedia contents and control information are received by the satellite receiver 112 (FIG. 1) and passed to the demodulator 126. The signals are subsequently demodulated at the demodulator 126 and converted to the multimedia contents and control information at the downlink control unit 128. The downlink control unit 128 subsequently stores the extracted multimedia contents and control information in the downlink database 130. Upon receiving and storing the multimedia contents and control information, the downlink control unit 128 processes the multimedia contents and control information in order to generate sequences of promotional multimedia to be broadcast.

In addition to generating multimedia sequences, the downlink control unit 128 runs a local customization process. For example, the text data for local advertisements can be added to customize the multimedia sequences. Such changes may be seen on a service monitor (not shown) attached to the cable headend control unit 128. The multimedia sequences are modulated for broadcasting at the channel modulator 126 and broadcast to viewers.

As discussed briefly above, the downlink modem 134 is connected to the uplink modem 126 (FIG. 2) via a regular telephone network for monitoring the satellite transmission. If a transmission error for missing data is detected, the downlink control unit 128 notifies the uplink control unit 120 (FIG. 2) of this error via the connection 116. In addition, the downlink control unit 128 periodically dials up the central uplink facility 102 (FIG. 1) and transmits diagnostic information of the remote downlink facility 106. The diagnostic information typically contains status reports of both hardware and software components of the remote downlink facility 106.

Referring to FIGS. 4-8, the contents of the uplink database 122 (FIG. 2) at the central uplink facility 102 (FIG. 1) is illustrated with attributes for each modular database.

Figure 4:
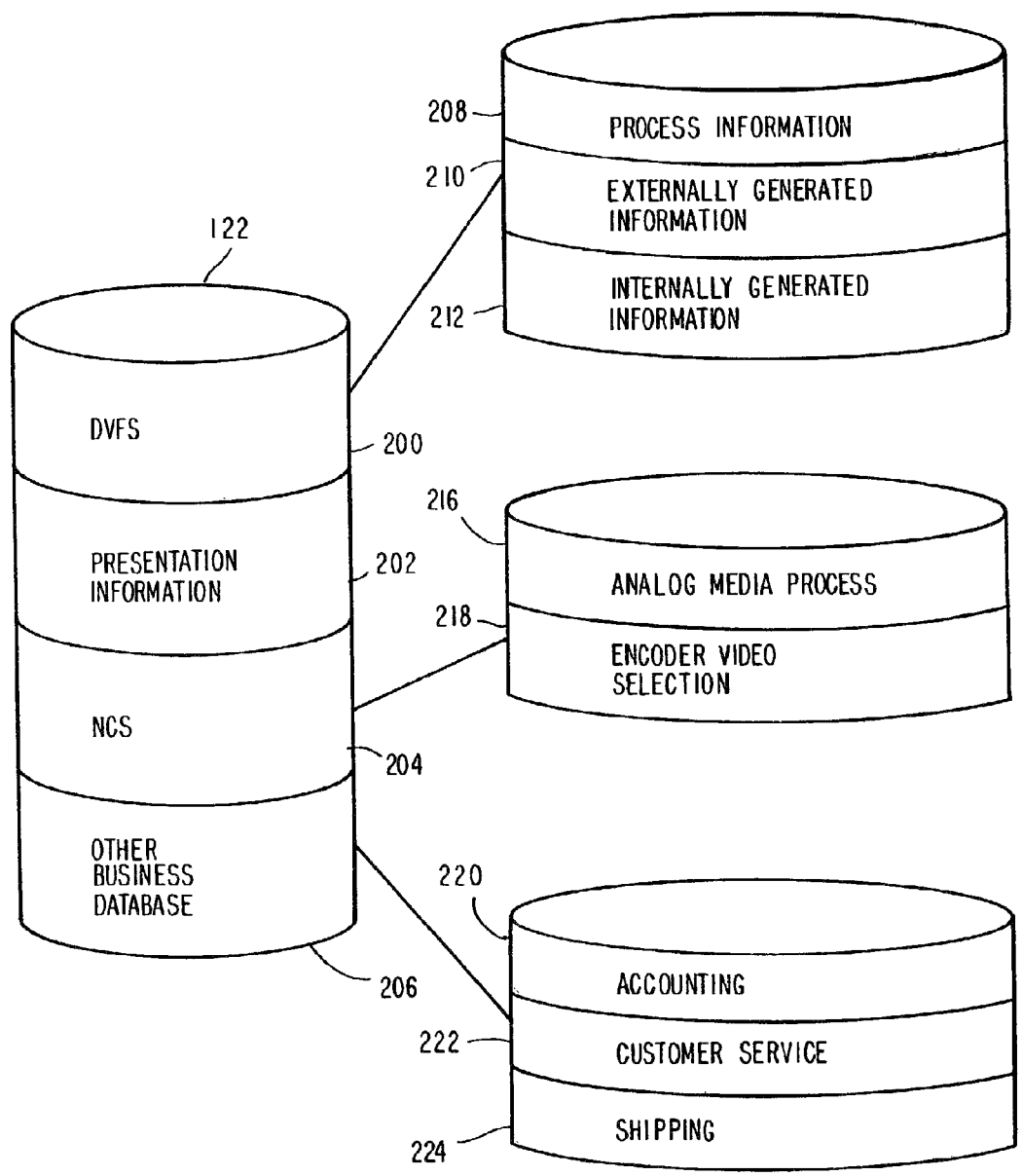
FIGS. 4-8 are block diagrams of an uplink database of FIG. 2 illustrating the uplink database in greater detail.

Referring specifically to FIG. 4, the uplink database 122 (FIG. 2) can be physically divided into several modular databases containing: DVFS ("Digital Video File Server") 200, presentation information 202, NCS ("Network Control System") 204 and other business databases 206.

The DVFS 200 contains the core data necessary to operate the multimedia distribution and broadcast system 100 (FIG. 1) and is designed to work efficiently with its neighboring modular databases. For example, the DVFS 200 works closely with the presentation information 202 and NCS 204.

The data in the DVFS 200 may further be divided into several categories according to their functions. These categories include process information 208, externally generated information 210 and internally generated information 212. The descriptions of these categories are provided in greater detail in reference to FIG. 5.

The presentation information 202 is a pseudo database containing an application closely related with the database files for presentation design. The presentation information 202 controls the look and feel of multimedia presentations that will be broadcast. The presentation information 202 thus determines the display arrangement of multimedia elements to be shown on a television viewer's screen. This arrangement is called a display page and is formed by placing and sizing graphical elements onto a screen space and setting individual properties such as a background color, font, style and color of text. The display pages are then grouped to form a sequence called a notebook. The notebooks are transmitted to the remote downlink facility 106 (FIG. 1) and used in conjunction with available multimedia contents to form broadcast scheduling. Since the look and feel of the multimedia presentation should be tailored to the preferences of the broadcast operators at the downlink facilities, the presentation information 202 contains the specific information in its file system to reflect such preference in the display pages and notebooks.

The NCS 204 is a relational database which holds information needed to produce and traffic videos used by the multimedia distribution and broadcast system 100 (FIG. 1). The data in the NCS 204 can be further divided into two following categories according to their functions: analog media process 216 and encoder video selection 218. The data contained in the analog media process 216 is used to track the processes of copying, dubbing, adding, clipping, titling and editing of the analog video clips as the analog video. For example, there would be corresponding records if the central uplink facility 102 (FIG. 1) receives a 1-inch or ¾ inch tape or if it edits the frames to conform to the standard video format used by the remote downlink facility 106 (FIG. 1). The encoder video selection 218, on the other hand, includes data for tracking the encoding or digitizing of the video clips between an analog source to a digital source.

Other business databases 206 include files concerning operational aspects of the multimedia distribution and broadcast system 100 (FIG. 1). Such operational aspects include accounting 220, customer service 222 and shipping 224. An example of operationally related databases is a helpdesk/customer service database.

Figure 5:
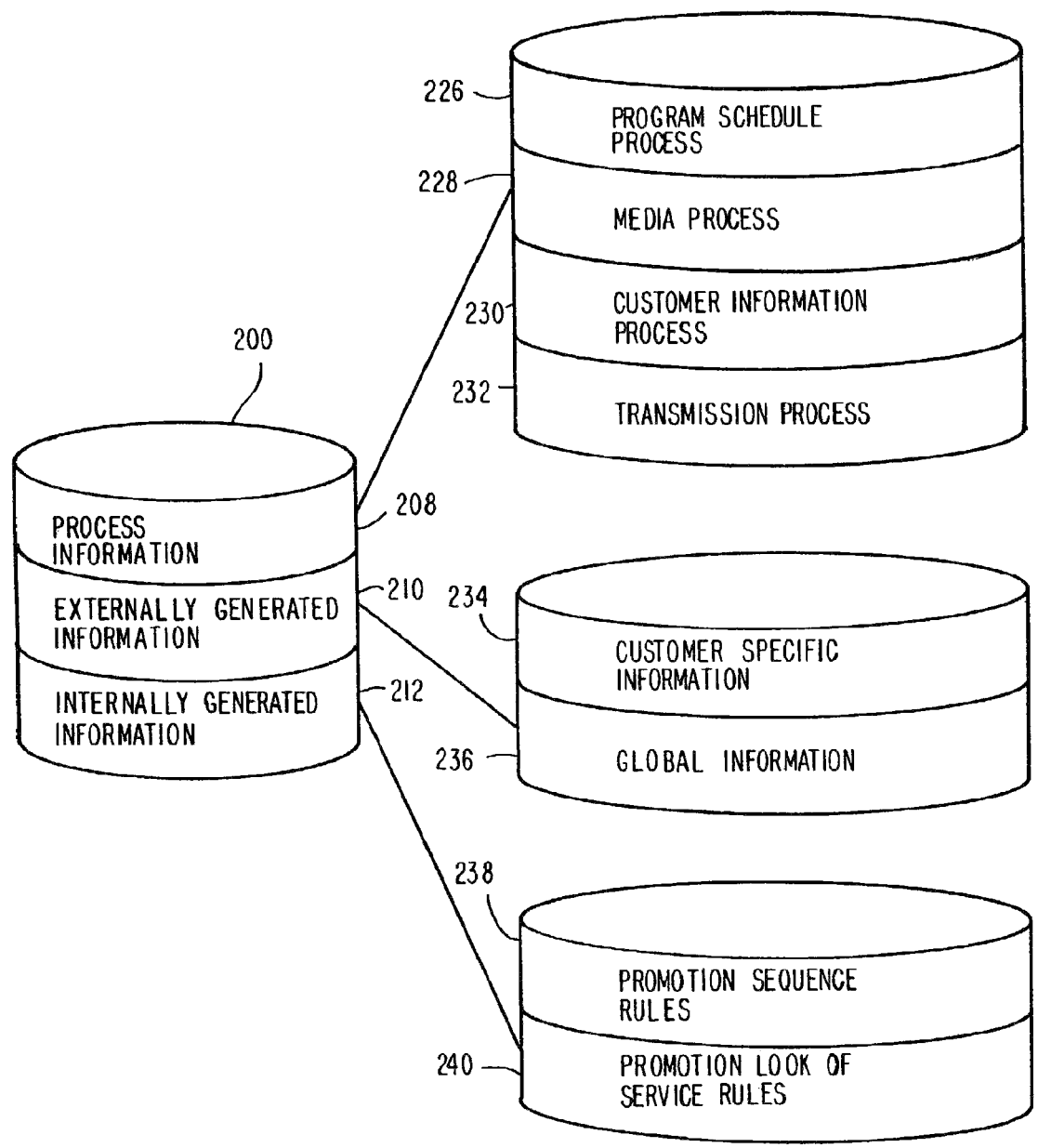

Referring to FIG. 5, the DVFS 200 consists of the process information 208, externally generated information 210 and internally generated information 212, each of which can be further divided into smaller categories by their functions as described herein below.

The process information 208 is in large part data used internally for efficient tracking and operation of the DVFS support processes. For example, from the process information 208, an operator can find out when particular multimedia contents were sent out, who sent out the multimedia contents or which multimedia contents were previously sent. The process information 208 is also used to automate the maintenance of the multimedia distribution and broadcast system 100 (FIG. 1). Generally the process information 208 is never sent outside the central uplink facility and not seen by the operators at the remote downlink systems. The process information 208 can be further divided into information containing the following functions: program schedule processes 226, media process 228, custom information processes 230 and transmission process 232, which are described in greater detail in reference to FIG. 6.

The externally generated information 210 is the core data for the multimedia distribution and broadcast system 100 (FIG. 1), which originates outside of the central uplink facility. The externally generated information 210, for example, includes various multimedia contents and control information (video, audio, titles and schedules) provided by the television network sources such as HBO. The externally generated information 210 may also contain data specific to the programming or pay-per-view events that air on local cable television service of the downlink facility 106 (FIG. 1). The externally generated information 210 can be categorized into two groups: customer specific information 234 and global information 236, which are described in greater detail in reference to FIG. 7.

The internally generated information 212 largely originates from experiences at the central uplink facility. These experiences are transformed into useful information in the uplink database 122 (FIG. 1) that controls the sequences at multimedia and display arrangements. The internally generated information 212 can be subjective in nature by making determination, for example, what mix of genres of multimedia will attract the most number of broadcast operators on the multimedia distribution and broadcast system 100 (FIG. 1). In order to attract the broadcast operators, the internally generated information 212 includes description of common characteristics of subscribers that are being targeted by the broadcast operators. This common characteristic may be described as, for example, impulse oriented, family oriented, and sports oriented.

The internally generated information 212 may further include description of how such common characteristics or orientations change over the course of the day, week or season. Generally, such data are manually translated into data sets which multimedia distribution and broadcast system 100 (FIG. 1) can decode. Another example may be a translated input of broadcast operators' preferences or philosophy for their particular broadcast programming. Also, broadcast operators' attempts to define the look and feel for their particular broadcast programming may be decoded and stored. The internally generated information 212 can be further divided by its function into promotion sequence rules 238 and promotion look of service rules 240 as described in greater detail in reference to FIG. 8.

Figure 6:
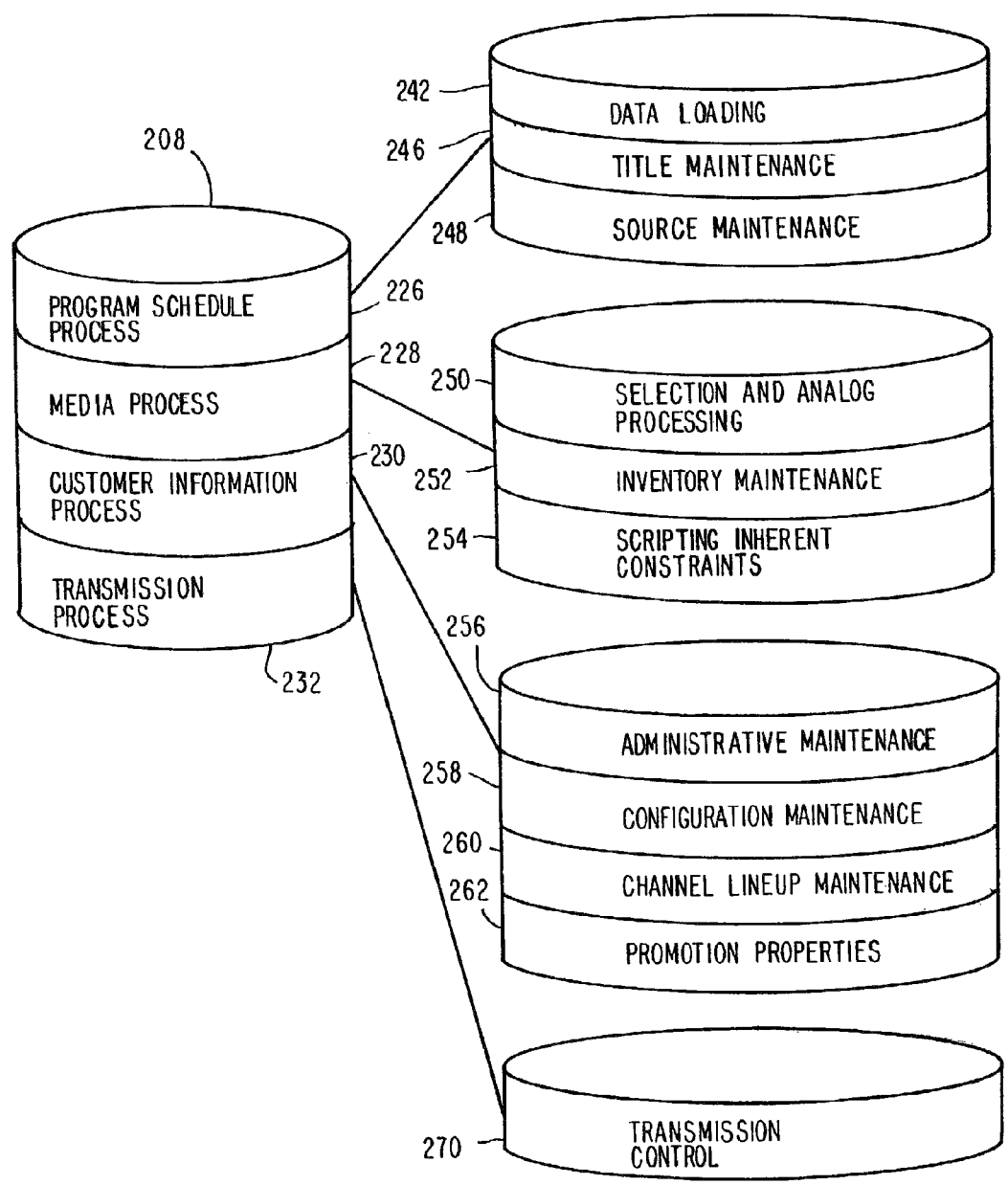

Referring to FIG. 6, the process information 208 includes data about the following processes: program schedule process 226, media process 228, customer information process 230 and transmission process 232.

The program schedule process 226 generally contains the schedule of the network sources such as HBO, SHOW TIME, CINEMAX and DISNEY CHANNEL. The program schedule process data 226 can be categorized by its relation to the following processes: data loading information 242, title maintenance information 244 and source maintenance information 246.

The data loading 242 contains process data for taking files generated from network sources or other data suppliers such as TV DATA located in Glenn Falls, N.Y., and converting these files into the uplink database 122 (FIG. 2) of the central uplink facility 102 (FIG. 1). Examples include identifications of workers who worked on certain data processing, status of data loading jobs and description of data loading jobs.

The title maintenance 246 contains process data for entering and updating the titles of the multimedia contents to be used in the multimedia distribution and broadcast system 100

(FIG. 1). The titles may be matched against the internal references of corresponding numbers or standard titles so as to avoid confusion where different vendors or network sources use different titles for the same media contents.

The source maintenance 248 contains process data for entering and mainly updating the information about the network sources. Examples are names, address and phone number of the contact persons at the network sources. Another example may be channel numbers for the network sources. All of the program schedule information can be put into work tables for in-house SQL ("Standard Query Language") applications which are programmed to extract and manipulate particular data.

The media process 228 contains process data that allow the NCS 204 to traffic and tie certain media contents in order to generate sequences of multimedia. The media process 228 may, be divided into the following categories: selection and analog processing 250, inventory maintenance 252 and scripting inherent constraints 251.

The selection and analog processing 250 include process data for selecting the multimedia contents to generate multimedia sequences. For example, in order to provide a multimedia distribution and broadcast service for a certain period of time for a particular broadcast operator, the uplink computer system 110 first looks at the schedule of the network sources to see what titles are, available during that period. Then the information about these titles is examined to see what weights or priority should be given for the available titles. For example, the success of a movie at the box office may be looked at to determine whether a particular movie gets chosen and how much it gets promoted. Thereafter, the clips of the chosen movies are edited and formatted for later broadcasting. The data for selection and analog process 250 may be contained in a table format.

The inventory maintenance 252 contains process data for receiving the clips from network sources or studios, giving a clip detail and a specific number, and storing at a certain place in the uplink database 122 (FIG. 2) for later retrieval. An example of a long term storage for multimedia contents is a CD jukebox called "DRM-5004X" manufactured by PIONEER located in Tokyo, Japan. The CD jukebox may be monitored by a jukebox directory that points to where a particular multimedia contents are located within the CD jukebox.

Scripting inherent constraints 254 contains process data so that the characteristic of each multimedia element in the multimedia contents is examined in order formulate certain properties for later identification and categorization. Examples of these characteristics are titles and duration of clips, network source constraints (e.g., mandating only HBO) or time constraints (e.g., starting at 7 P.M.). These characteristics are stored in the uplink database 122 (FIG. 2) along with the multimedia contents.

The customer information process 230 contains process data related to the remote downlink facility 106 (FIG. 1). The customer information process 230 is categorized into the following: administrative maintenance 256, configuration maintenance 258, channel lineup maintenance 260 and promotion property 262.

The administrative maintenance 256 includes reference information including names, addresses and telephone numbers and social security numbers which are primarily designed for operational verification.

The configuration maintenance 258 contains administration information such as the names of files, applications, hardware or services. The configuration maintenance information 258 also may be used for operational verification.

The channel lineup maintenance 260 contains data for insuring the efficient updates of the channel lineup of the downlink facilities. The update operation is enhanced by grouping a number of downlink facilities and updating the group at once instead of updating each of the downlink facilities individually.

The promotion properties 262 contains data for allowing use of a reference table so that when any particular downlink facility 106 (FIG. 1) runs particular multimedia contents, the necessary information is efficiently provided by reference to such table. For example, the remote downlink facility 106 (FIG. 1) that charge $19.99 for all of their wrestling events may be put into one category of local stations in the reference cable. This price information is thereafter provided efficiently to the group of these local stations whenever such wrestling events appear in their schedule. Thus, if the remote downlink facility 106 (FIG. 1) includes a wrestling event in its schedule, the price for the promotion of the wrestling event is automatically set at $19.99.

The transmission process 232 contains the information about transmission control 270. The reports of transmission status, start time, duration and error detection are all put into the uplink database 122 (FIG. 1). The data of transmission control 270 may be used to keep track of and automate some steps in the satellite transmission.

Figure 7:
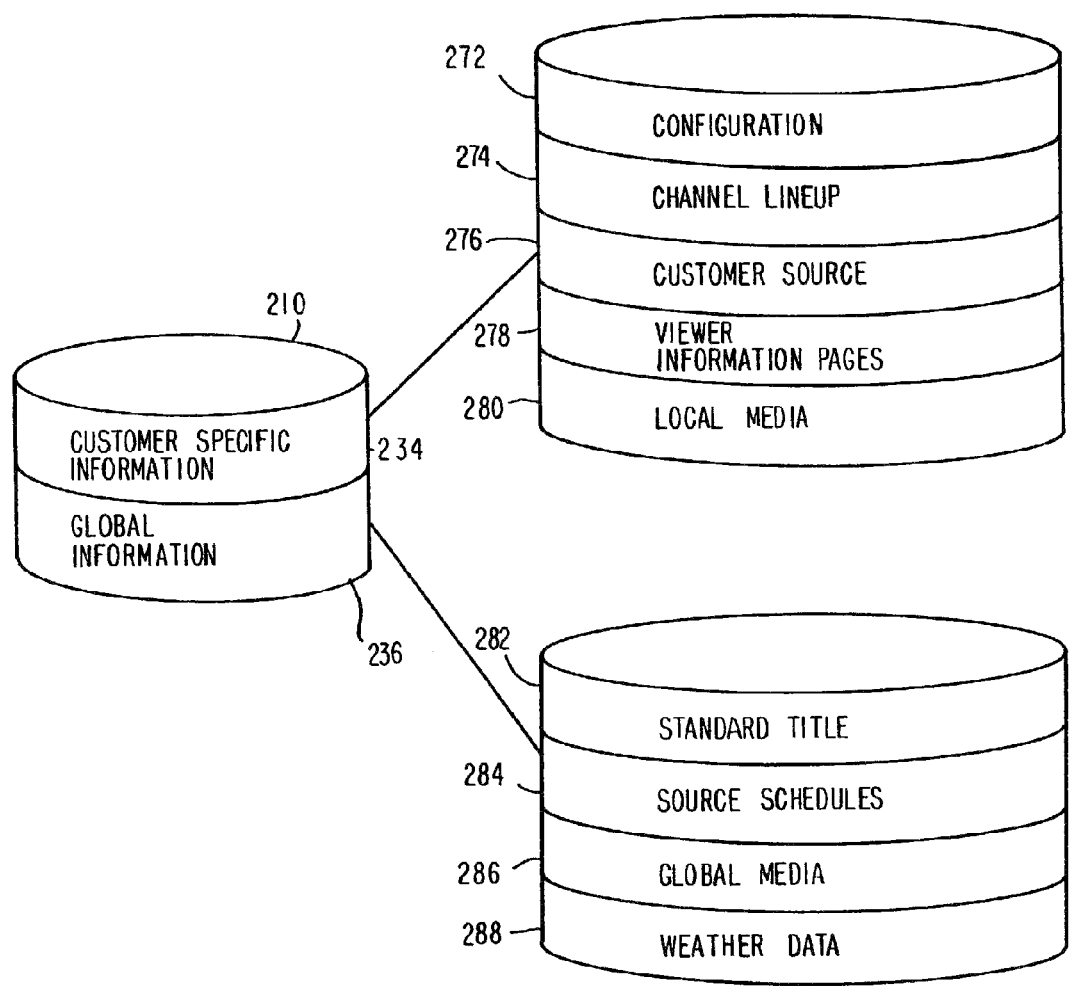

Referring to FIG. 7, the externally generated information 210 is divided into the following categories: customer specific information 234 and global information 236.

The customer specific information 234 is data specific to each of the broadcast operators located at the remote downlink facilities. For example, this customer specific information 234 may include descriptions of programming to be aired on a specific cable television system. The customer specific information 234 can be categorized into the followings: configuration 272, channel lineup 274, custom source 276, viewer information pages 278 and local media 280.

The configuration information 272 includes various default information about the broadcast operator at the remote downlink facility 106 (FIG. 1). One example is a time zone in which the remote downlink facility 106 (FIG. 1) is located. Another example is a default order text including a pay-per-view movie order instruction, price and telephone number. Yet another example is the local channel number assignments for the network sources (e.g., channel number 29 for SHOWTIME). Yet another example is a default background displaying broadcast operator's logo, video, audio, banners and toplines.

The channel lineup data 274 is the information on the properties that are related to a particular downlink facility's programming. The channel lineup data 274, for example, may contain the schedule of events that the remote downlink facility 106 (FIG. 1) wishes to promote. The channel lineup data 274 may also include custom-programming specifications or custom schedules having rescheduled events or modified titles. The channel lineup data 274 may also include sequence of channels and channel numbers provided by the remote downlink facility 106 (FIG. 1).

The custom source information 276 is the data specific to a particular customer/cable system. The custom source information 276 typically comes from a customer/cable system who puts together its own sources. Generally, this type of customer is a pay-per-view movie provider or syndicate of major networks (e.g., NBC) interested in their own local programming. The customer source information 276 contains dynamic configurations that are related to functions of programming schedules. More specifically, these configurations describe the specific needs of the downlink facility 106 (FIG.

1) to best promote its events and programs at its particular locality and market. For instance, configurations may define preferable categories of events, timing of promotions, frequency of promotions, price changes and ordering instructions. The customer source information 276 thus defines how the remote downlink facility 106 (FIG. 1) wish to promote its programming.

The viewer information pages 278 generally includes helpful hints for viewers. The viewer information pages 278, for example, may be a text explaining a blocking option for children.

The local media 280 includes the multimedia contents of video, audio, text and other multimedia elements unique to a particular remote downlink facility 106 (FIG. 1).

The global information 236 is the data general to all of the remote downlink facilities in the multimedia distribution and broadcast system 100 (FIG. 1). The global information 236 may be either a highly integrated database that is a part of the DVFS 200 or an independent database neighboring the DVFS 200, the presentation information 202 and the NCS 204. The global information 236 holds data that is common to other databases needed to run the multimedia distribution and broadcast system 100 (FIG. 1). The global information 236 has the following data items: standard titles 282, source schedules 284, global media 286 and weather data 288.

The standard title 282 contains unique titles for the multimedia contents that most network sources and downlink facilities use in their listings. The standard title 282 also contains unique properties that are designed to categorize multimedia contents. The standard title 282 may include titles, ratings and synopsis of movies.

The source schedule 284 contains a global schedule of programming information on network sources such as HBO, TNN and SHOWTIME. For example, the title of a program on HBO at 2 P.M. on September 30 may be included in the source schedules 284.

The global media 286 includes multimedia contents such as video, audio and text that can be used at any of the remote downlink facilities. The global media database 284 also contains criteria of the multimedia contents necessary to categorize the media contents. For example, examples of such criteria are the box office sales of movies and the events that the multimedia contents promote.

The weather data 288 containing weather reports or forecasts across the United States may be provided to all of the remote downlink facilities in a similar manner as the global media.

Figure 8:
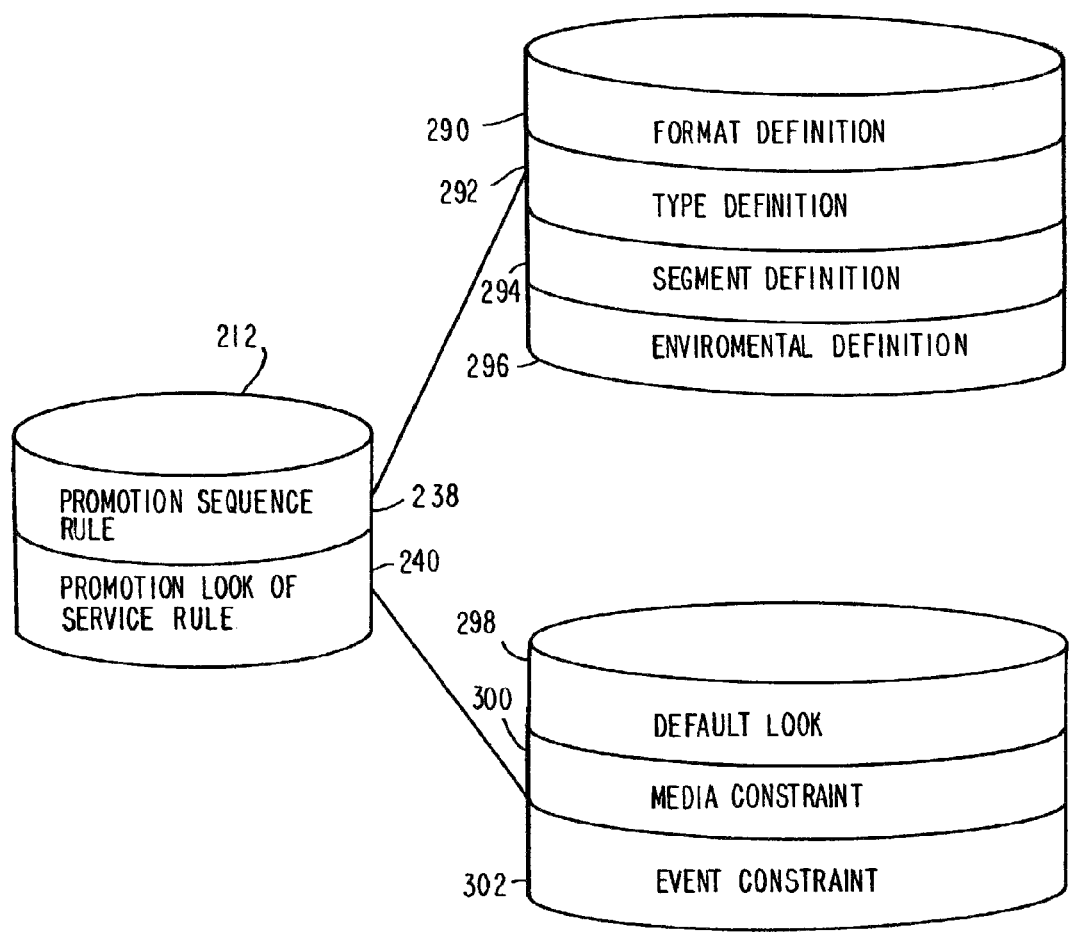

Referring to FIG. 8, the internally generated information 212 is categorized into two categories: promotion sequence rule 238 and promotion look of service rule 240.

The promotion sequence rule 238 provides a set of rules that the downlink facility 106 (FIG. 1) go by in constructing a sequence of multimedia. The promotion sequence rule 238 can be categorized into the followings: format definition 290, type definition 292, segment definition 294 and environmental definition 296.

The format definition 290 is the data selected by a service configuration parameter to determine, for example, the common characteristics of the television viewers that are being targeted by the broadcast operators. The type of the televisions viewers may be, for example, impulse buyers, sports oriented or family oriented. The data is also used to determine which groups of viewers get particular multimedia.

The type definition 292 is a selection rule for selecting the multimedia contents and display arrangements that will promote a specific event. An example of such type definition 292 is a database query: "select a display arrangement and fill the data fields in the display arrangement from events that will occur within next 4 hours." Another example is a rate control query: "play X number of sports promotions per hour during a prime time."

The segment definition 204 is a list of database queries that form sequences of multimedia to be played. The segment list defines promotion mix, for example, of impulse specific and planned specific promotions. Another example is the mix of sports and movie promotions. The segment list also defines constraints and circumstances which are typically timed to a local parameter.

The environmental definition 296 provides definitions of conditions with combinations of parameter and local variables. The definitions of conditions are used by the set of rules to construct the multimedia sequences to translate the needs of the downlink facility 106 (FIG. 1). An example of such environmental condition is: "Is the time 10 minutes after the hour and is my local configuration video-insertion parameter equal to 'yes'?" In order to develop definitions of conditions, the uplink computer system 110 (FIG. 1) first determines which sets of data 10, are necessary in formulating a schedule. The necessary sets of data typically include at least the starting time, duration and channel information. Thereafter, the uplink computer system 110 (FIG. 1) determines the definitions of conditions using the set of data. For example, definitions of conditions for a popular movie or blockbuster movie may be defined as those movies that raised revenues exceeding twenty million dollars at the box office.

The promotion look of service rule 240 determines the look and feel of the final screens viewed by television viewers. The promotion look of service rules 240 can be categorized into the followings: default look 298, media constraint 300 and event constraint 302.

The default look 298 is a combination of geometric layouts of the various graphics that make up the display as well as the video, audio and text that give color and multimedia contents to display arrangements. The multimedia distribution and broadcast system 100 (FIG. 1) actually has a set of choices for the default look 298 by using predefined display arrangements in the notebooks provided by the presentation information 202 (FIG. 4). More specifically, the default look 298 points to a particular notebook providing display pages where each display page runs its own video, audio, text and other multimedia elements for a particular period of time. For example, the default look for the downlink facility 106 (FIG. 1) may be a display page with four windows, each of which is showing a different movie clip.

The media constraint 230 contains generally a set of properties of multimedia contents that are attached in a process called scripting. The multimedia contents are generally composed of particular titles sources, durations and categories. After examining these various characteristics, the uplink control unit 120 (FIG. 2) attaches common constraints to the appropriate group of multimedia contents. For example, titles of events that the video clip may be used to promote can be attached to the video clip. Other examples of common constraints are an air time range and a source type.

The event constraint 232 contains a set of properties of events that determines whether a particular event is selected to be subject of a particular sequence of promotions. The selection is often a function of constraints which are implicit in the event such as a title, air time, rating, source and viewer.

Figure 9:
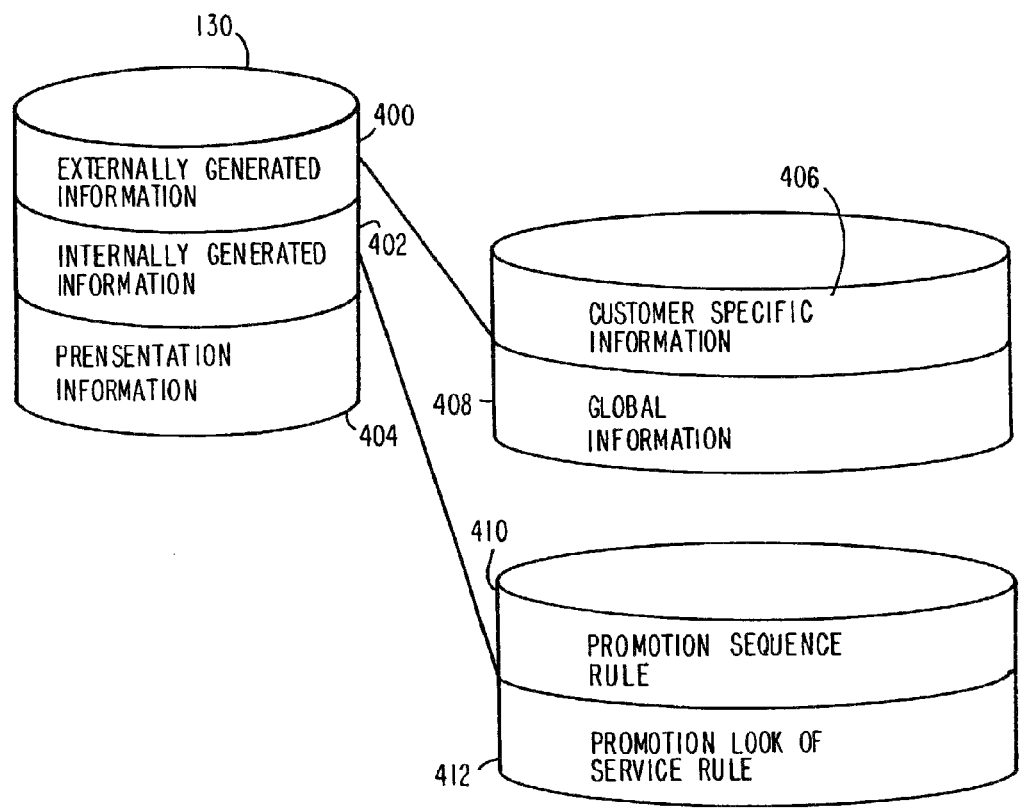
FIGS. 9-11 are block diagrams of a downlink database of FIG. 3 illustrating the downlink database in greater detail.
Figure 10:
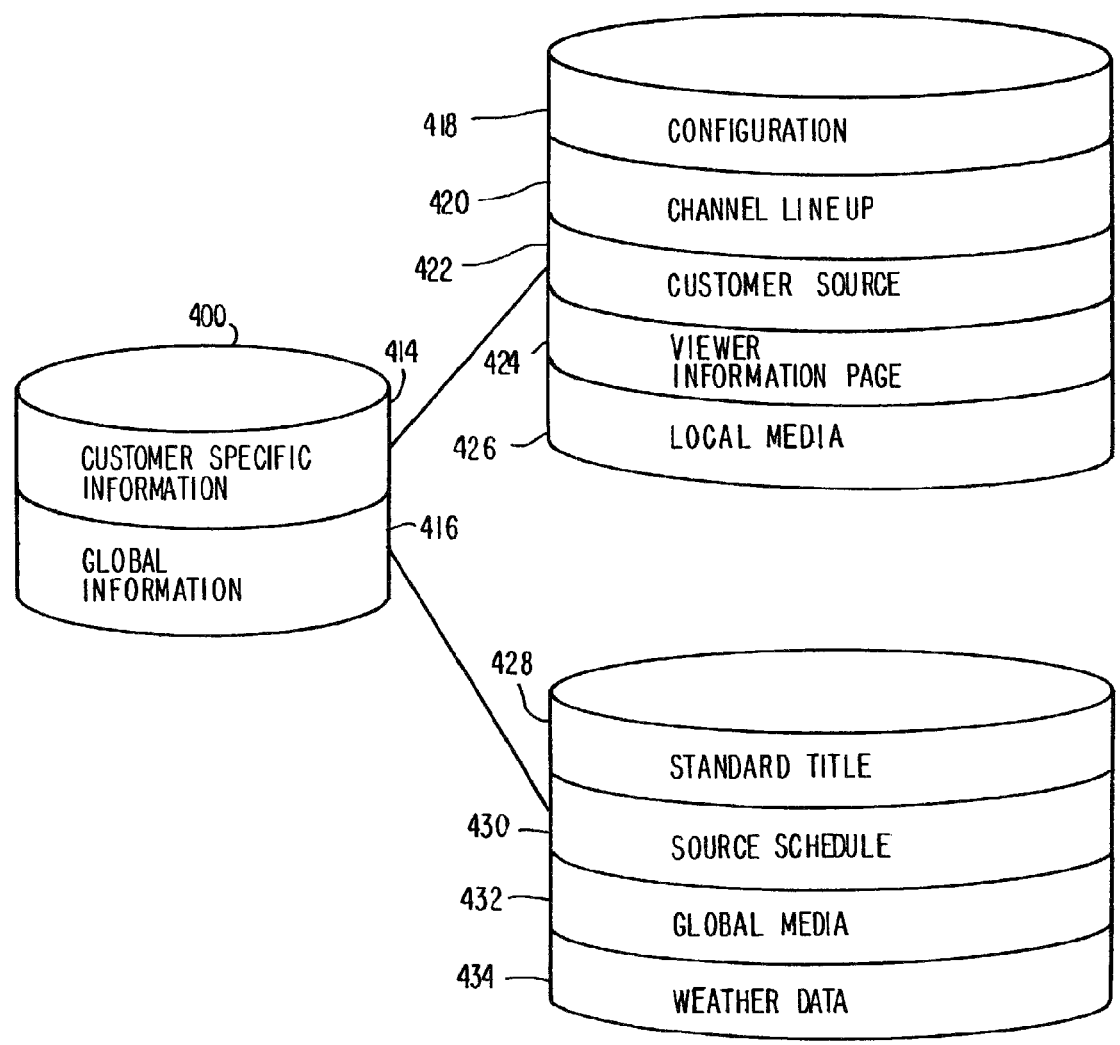
Figure 11:
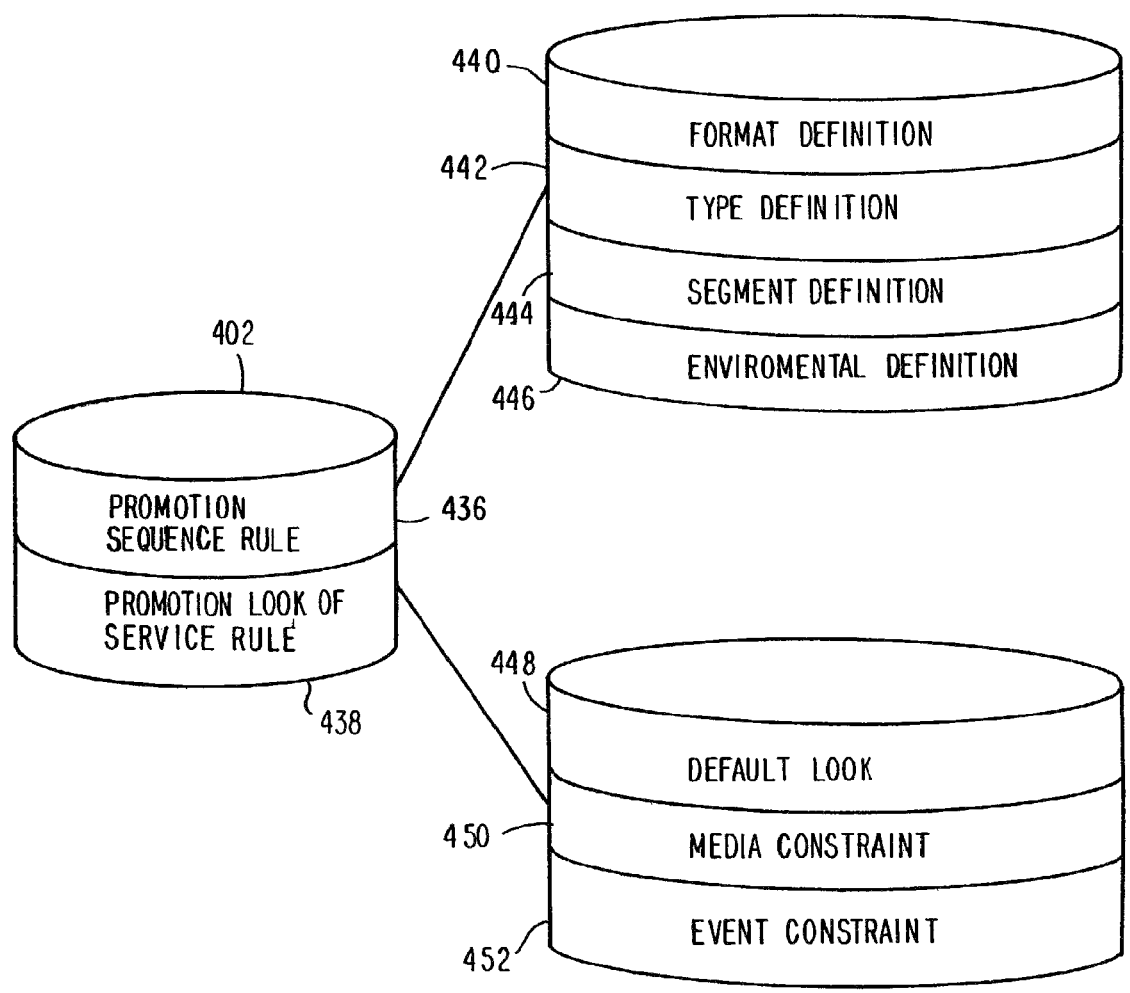

Referring to FIGS. 9-11, the contents of the downlink database 130 (FIG. 3) located at the remote downlink facility 106 (FIG. 1) is illustrated with attributes for each modular database. The structure of the downlink database 130 (FIG. 3) is very similar to the structure of the uplink database 122

(FIG. 2) since most of the data contained therein originates from the uplink database 122 (FIG. 1). The description of many of the modular databases in the downlink database 130 (FIG. 3), therefore, can be somewhat abbreviated because more extensive discussion has already been provided for the corresponding modular databases in FIGS. 4-8. The data size of the downlink database 130 (FIG. 3) may be, however, significantly smaller than the data size of the uplink database 122 (FIG. 2) because the downlink control unit 128 (FIG. 2) generally screens the received data from the central uplink facility 102 (FIG. 1) and stores only the data necessary and specific to the remote downlink facility 106 (FIG. 1) in the downlink database 130 (FIG. 3). For example, the configuration data, channel lineup data, customer source data and local media for other downlink facilities are screened out by the downlink control unit 128 (FIG. 3).

Referring specifically to FIG. 9, the downlink database 130 (FIG. 3) consists of the following modular databases: externally generated information 400, internally generated information 402 and presentation information 404. The externally generated information 402 may further be categorized into customer specific information 406 and global information 408. The internally generated information 402 may also be categorized into promotion sequence rule 410 and promotion look of service rule 412. The detailed descriptions of each of these databases are abbreviated because more extensive discussion has been already provided for the corresponding databases in FIGS. 7 and 8.

Referring to FIG. 10, the externally generated information 406 (FIG. 9) includes customer specific information 414 and global information. The customer specific information 406 can be categorized into the following's: the configuration data 418, channel lineup data 420 customer source data 422, viewer information page 424 and local media 426.

As discussed above, the customer specific information 406 contains only the data specific to a particular remote downlink facility 106 (FIG. 1) as the data transmitted from the central uplink facility 102 (FIG. 1) is screened and edited by the downlink computer unit 130 (FIG. 3). Some data included in the customer specific information 414 may be entered locally at the remote downlink facility 106 (FIG. 1) in order to facilitate customization of multimedia sequences. For example, the local media 426 may contain video clips for advertising for local retailers or television programs.

The global information database 416, on the other hand, is likely to contain almost identical data as the global information database 236 (FIG. 5) located at the central uplink facility 102 (FIG. 1). The global information 416 is further categorized into standard title 428, source schedule 430, global media 432 and weather data 434. The detailed descriptions are abbreviated because more extensive discussion has been already provided for the corresponding databases in FIG. 7.

Referring to FIG. 11, the promotion sequence rule 436 includes format definition 440, type definition 442, segment definition and environmental definition 446. The promotion look of service rule 438 contains default look 448, media constraint 450 and event constraint 452. These rules are used by the downlink control unit 128 (FIG. 3) to generate multimedia sequences in desired display arrangements. The detailed discussion of these rules is abbreviated because more extensive discussion has been already provided for the corresponding rules in FIG. 8.

FIGS. 12-17 depict various promotion screens generated at the remote downlink facility 106 (FIG. 1) as they would appear on viewers' television or monitor displays. More specifically, these screens are generated by the downlink control unit 128 (FIG. 3) which controls the display arrangements primarily based on the data contained in the presentation information 404 (FIG. 9) and the promotion look of service rule 412 (FIG. 9). As discussed above, the notebooks consist of multiple display pages, each of which defines a specific graphical arrangement of multimedia objects such as video, audio and text. For example, the multiple display pages in a notebook may provide options of a ⅔ screen and full screen for a video clip. There may be also another display page configured to show multiple video clips simultaneously.

Furthermore, the multimedia contents can be Used very effectively with the display pages providing different background information. This is an important benefit because the amount of multimedia contents that are delivered to the remote downlink facilities is limited due to the bandwidth and cost constraints of a satellite transmission. Various backgrounds in different display pages can enhance the quality of multimedia sequences by providing variety of information related to sports, music, shows and movies while running the limited number of video clips. In addition to display pages, the notebooks also contain timing information about the display pages, such as when a display page begins and how long the display page is to be displayed. The timing information also defines transitions and other effects that occur between display pages. All of the multimedia objects in a single display page have the same begin time and duration and some display pages may overlap other display pages.

The notebooks may also contain an object called TextStyle which defines a font, color, size and any other text attributes. The TextStyle may be set by an operator of the downlink computer unit 128 (FIG. 3) so that the text objects have the assigned text attributes at the display page level, the notebook level or at the global level.

Figure 12:
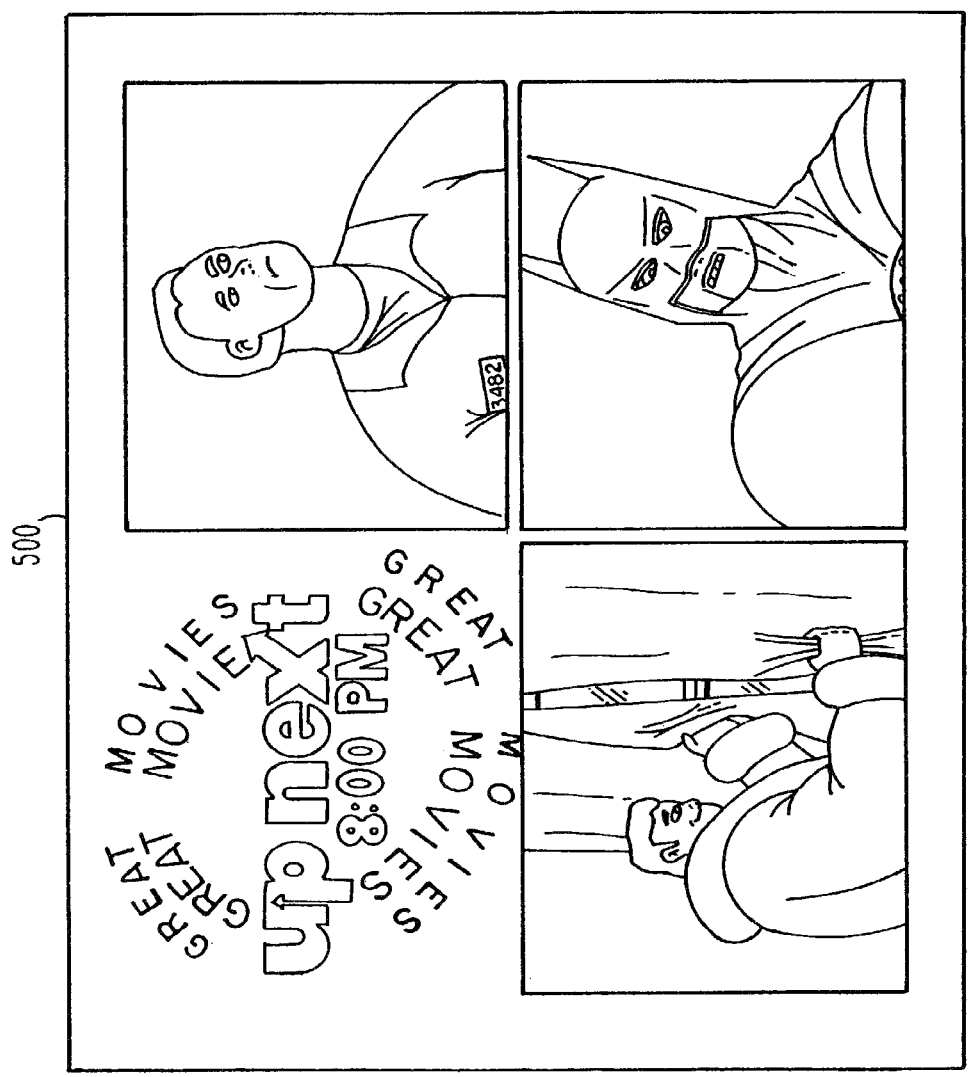
FIGS. 12-17 are exemplary screen displays which illustrate the multimedia sequences generated by the multimedia distribution and broadcast system of the present invention.

Referring specifically to FIG. 12, a screen may present a display page 500 that is configured to run multiple video clips simultaneously on a single screen by utilizing multiple windows. Although the display page 500 has a different arrangement from a typical display page that runs a single video clip, it does not necessarily require a different set of video clips. In fact, the display page 500 utilizes the same set of video clips that are used by many other display pages in the notebooks and maximizes the utilization of the available resources at the remote downlink facilities.

The selection of the event, display page and multimedia contents is generally decided by evaluating both the media constraint 450 (FIG. 11) and event constraint 452 (FIG. 11). The selection of events in the display page 500 is, for instance, determined by evaluating a "up-next" line up. The up-next line-up refers to the promotion sequence for the events that start within a certain time period. Here, three pay-per-view events are selected for promotion because these events are scheduled to start during next one hour. As shown, all of the selected movies happen to have the same starting times (e.g., 8 o'clock) that fall within one hour from the current time, Subsequently, the multiple window display page 500 is invoked in order to allow viewers to view all three pay-per-view events simultaneously. Alternatively, different display pages may be selected to run these video clips individually in sequence. Thereafter, the audio clips, backgrounds and text corresponding to selected events are retrieved by the display page 400 to generate multimedia sequences.

In the display page 500, the viewers are able to view promotion clips of three movies, "Crimson Tide," "The Santa Clause" and "Batman Forever" on one screen without having to flip through the channels or wait for the next sequence of video clips. The remaining quadrant is used to provide the information that all three pay-per-view movies have been set to start at 8:00 P.M.

Figure 13:
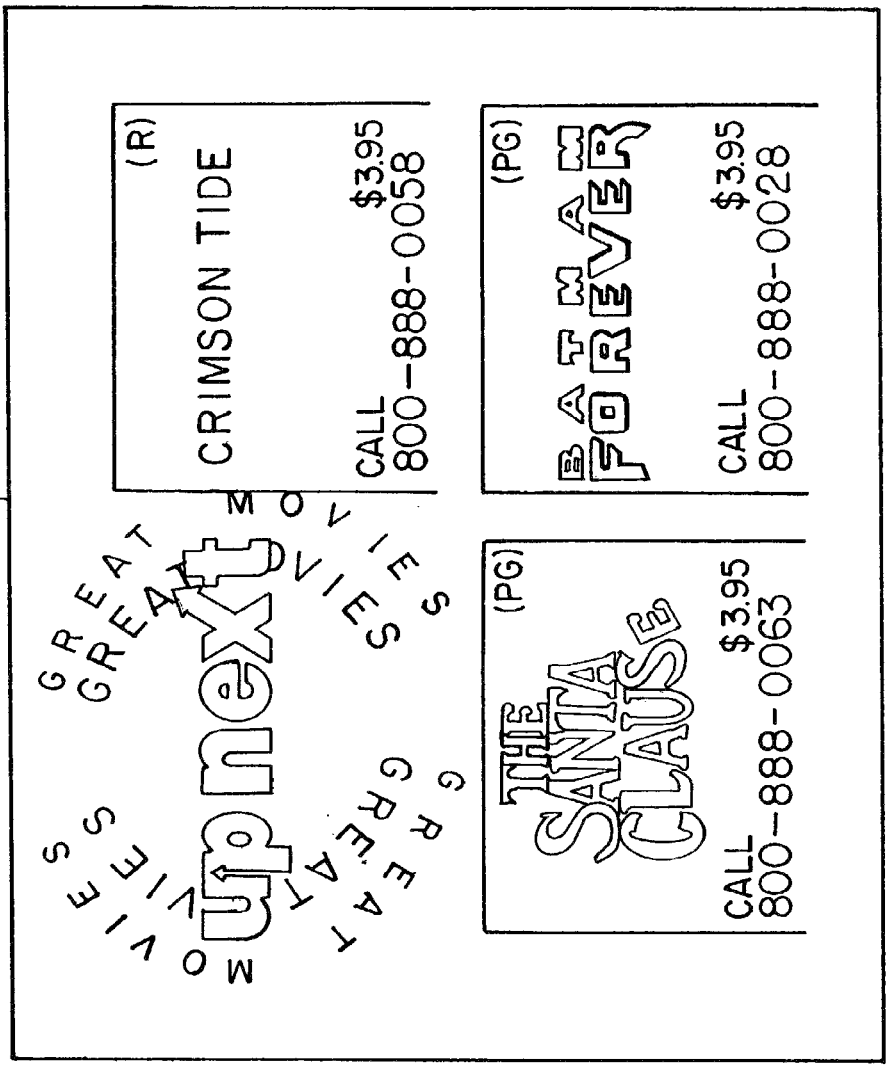

Referring to FIG. 13, another display page employing a different combination of multimedia is used to promote the same events as in FIG. 12. More specifically, the display page 510 in FIG. 13 provides three text windows, each describing the movies, "Crimson Tide," "The Santa Clause" and "Batman Forever." The text information may include a rating, order telephone number and price related to each pay-per-view movie as shown in FIG. 13. The text information may further provide other information such as duration, critique or synopsis of each movie.

FIGS. 14-17 illustrate the use of the same video clip with different background information. The capability to use the same video clip in various display arrangements defined by different notebooks adds commercial value. Since the data size of notebooks is significantly smaller than the data size of multimedia contents, the use of the notebooks enhances the quality of the multimedia at low cost without having to expand the database capacity or transmission capacity.

Figure 14:
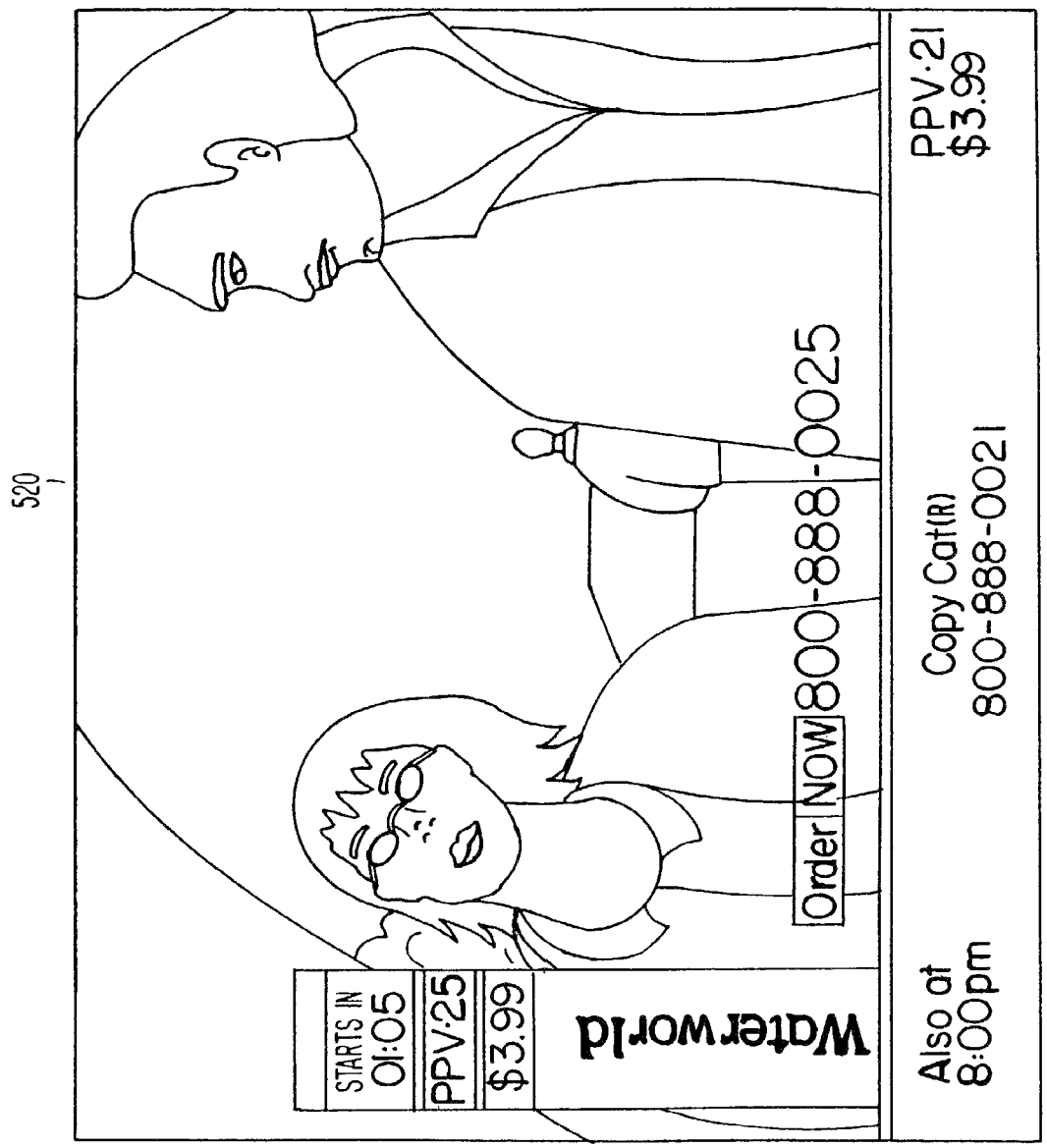

Referring specifically to FIG. 14, the background elements include a channel reference number, price, start time of a movie, countdown clock, phone number and order text. In order to display these elements without compromising the display of a movie clip, a display page 520 with the ¾ size window is used. This ¾ size window for the video clip allows separation between the background information and the video clip. Such separation is important especially when the display page 520 presents information unrelated to the video clip that is running on the screen.

The display page 520, for example, is running a video clip of a movie "French Kiss" while providing information about a movie "Waterworld" as well as information about a movie "Copycat." The side bar in the display page 520 includes the countdown clock, channel number, price, release year, theme and title, "Waterworld." The bottom bar includes the start time, title, phone number, channel and price of yet another pay-per-view movie "Copycat." The clear separation among the window, side bar and bottom bar prevents confusion. The Selection of the display page, therefore, may be determined based on a spacial need to present a particular information at the time.

The display page 520 also depicts other features to make the screen more presentable. The ability to rotate a text display to fit the side bar, for example, provides variations in the display page 520. As shown, the title graphic of "Waterworld" at a perpendicular relationship with the bottom bar improves the appearance of the whole screen without compromising the shape of the window that is running the video clip of "French Kiss."

Figure 15:
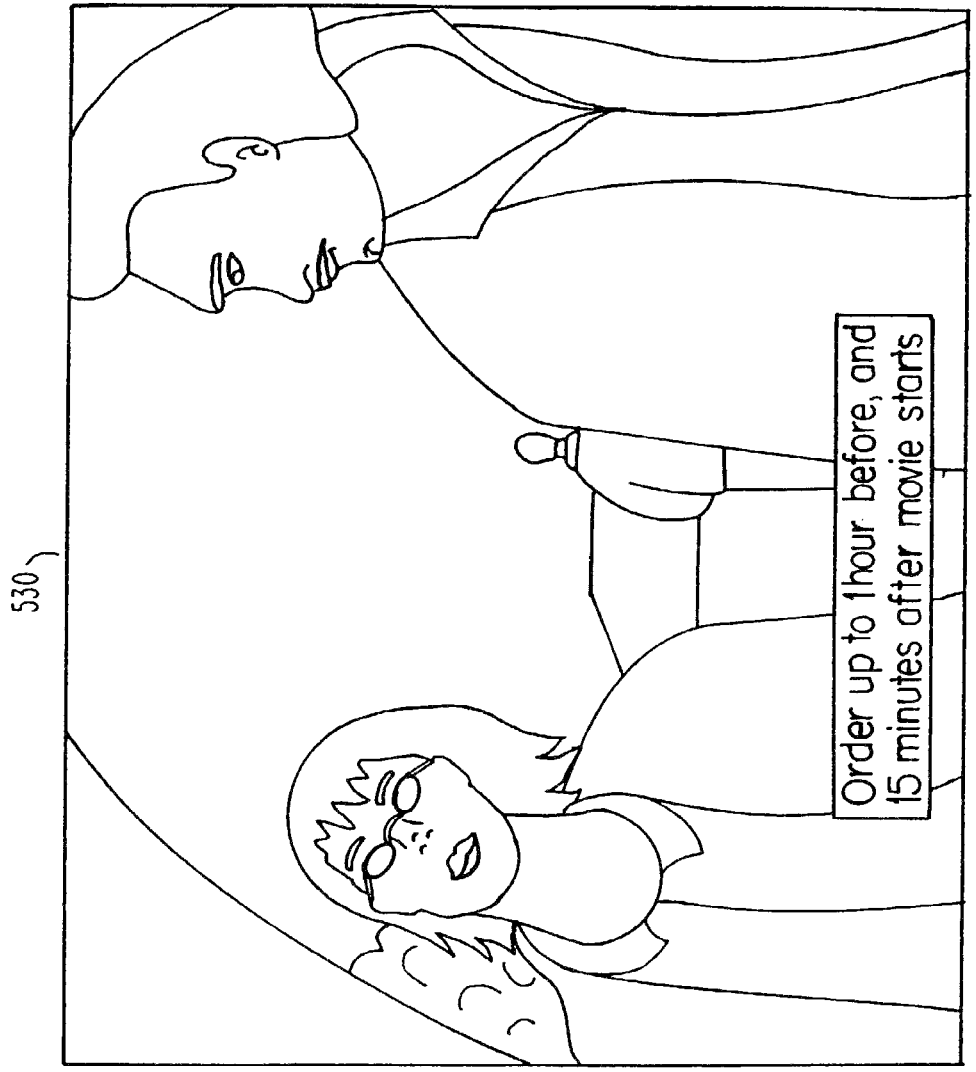

Referring to FIG. 15, the same video clip of "French Kiss" as in FIG. 14 is utilized in a different display page 530. The full size window is used in FIG. 14 instead of ¾ size window in FIG. 15 to run the same video clip. Also, the side and bottom bars are removed from the display page 530. Instead, there is only a single overlay text at the bottom of the screen describing order instructions. The change from the display page 520 to the display page 530 during broadcasting provides variation that would more likely attract the viewer's attention and increase the value of promotions. Also, more text information may be provided in various display arrangements to better inform the viewer. It should be noted that a video clip may be resized in accordance with notebook instructions to fit a variety of desired screen formats. For example, the clip of "French Kiss" shown in the display page 530 may be reduced to fit in one of the quadrants shown in the display page 500 of FIG. 12.

Figure 16:
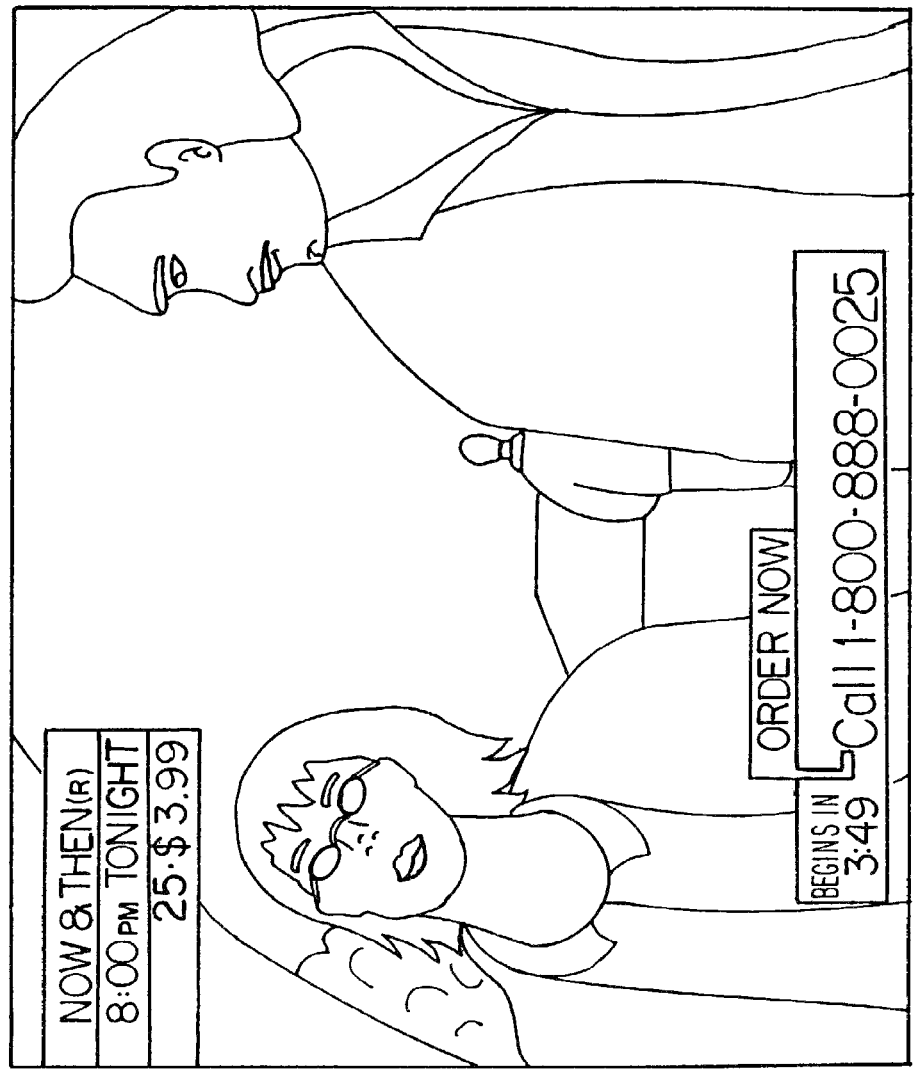

Referring to FIG. 16, a display page 540 similar to the display page 530 of FIG. 15 is illustrated with the same video clip of "French Kiss." The display page 540, however, includes more overlay text as well as a running clock. Also provided is the order telephone number for "French Kiss" in the bottom overlay and the information about another pay-per-view movie called "Now and Then" in the top overlay. Specifically, the top overlay displays the title, rating, start time, date, channel and price of "Now and Then." The overlays provide yet another opportunity for broadcast operators to maximize promotional values and bring in more revenues.

Figure 17:
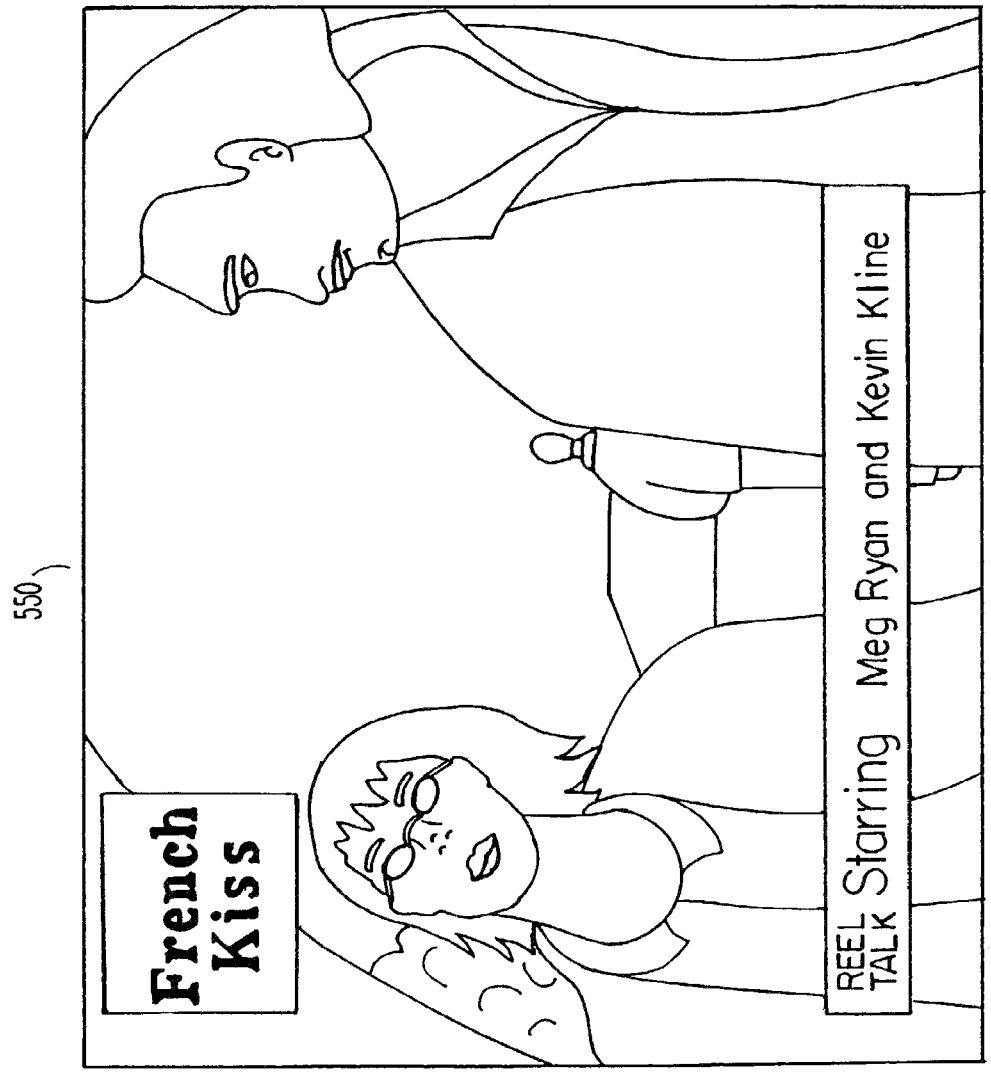

Referring to FIG. 17, a display page 450 similar to the display pages 430 and 440 of FIGS. 15 and 16 is illustrated. The display page 450 presents the information specific to the movie clip that is currently running. The display page 450 provides the names of the main actor and actress, "Meg Ryan and Kevin Kline," at the bottom overlay while providing the title of the movie, "French Kiss," in the top overlay. Again, with the use of the notebooks, this additional display arrangement is provided by the multimedia distribution and broadcast system 100 (FIG. 1) without incurring high costs that would incur otherwise to transmit and store significantly more multimedia contents to offer variety in the multimedia sequences.

FIGS. 18-19 depict a scheduling process and an exemplary implicit schedule generated at the remote downlink facility 106 (FIG. 1): The schedule is generated by the downlink control unit 128 (FIG. 3) based on the control information contained in the downlink database 130 (FIG. 3). It should be noted, however, that the schedule may be generated alternatively at the central uplink facility 102 (FIG. 1) and transmitted to the remote downlink facility 106 (FIG. 1). The schedule may yet be partially generated at the central uplink facility 102 (FIG. 1), transmitted to the remote downlink facility 106 (FIG. 1) and completed as the final schedule by the downlink control unit 128 (FIG. 3).

Referring specifically to FIG. 18, the creation process of an exemplary schedule is illustrated by depicting the progressive results as the schedule elements are added together to produce a skeleton. The first skeleton 600 represents a global absolute schedule that may have timed and dated information. The global absolute schedule may be a national advertisement placed by the central uplink facility 102 (FIG. 1). The second skeleton 602 represents a local absolute schedule which can be built from customer specific information 234 (FIG. 7). The third skeleton 604 is an absolute rate schedule which is a highly repeatable scheduling function. For example, the advertisements configured to interrupt the schedule at a certain frequency may be placed in the schedule as long as these advertisements do not conflict with the advertisements previously placed by the global and local absolute schedules. Finally, the fourth skeleton 606 is filler segments which fill up the gaps in the schedule. The combination of these skeletons 600, 602, 604 and 606 constructs an implicit schedule 608 which consists of a set of conditions defined by the global and local needs, absolute rate constraint and filler segments.

FIG. 19 illustrates an example of the implicit schedule 608 in a table format. The implicit schedule 608 preferably includes the following columns: promotion type 610, length of promotion 612 and starting time 614. It should be noted that the implicit schedule may include the conditions other than the ones defined here. The downlink control unit 128 (FIG. 3) uses the set of conditions and attributes as defined in this implicit schedule in order to locate proper multimedia contents. For example, a local advertisement 616 needs the multimedia contents that runs for two and half minutes starting from 0:54:05. Similarly, the national advertisement 618 needs the multimedia contents that runs for one minute from 0:56:35. When the downlink control unit 128 (FIG. 3) finds the multimedia contents that satisfy these conditions, the implicit schedule 608 is filled with the title of video, audio, background, text and notebook. As a result, the implicit schedule 608 is converted to an explicit schedule.

Figure 20:
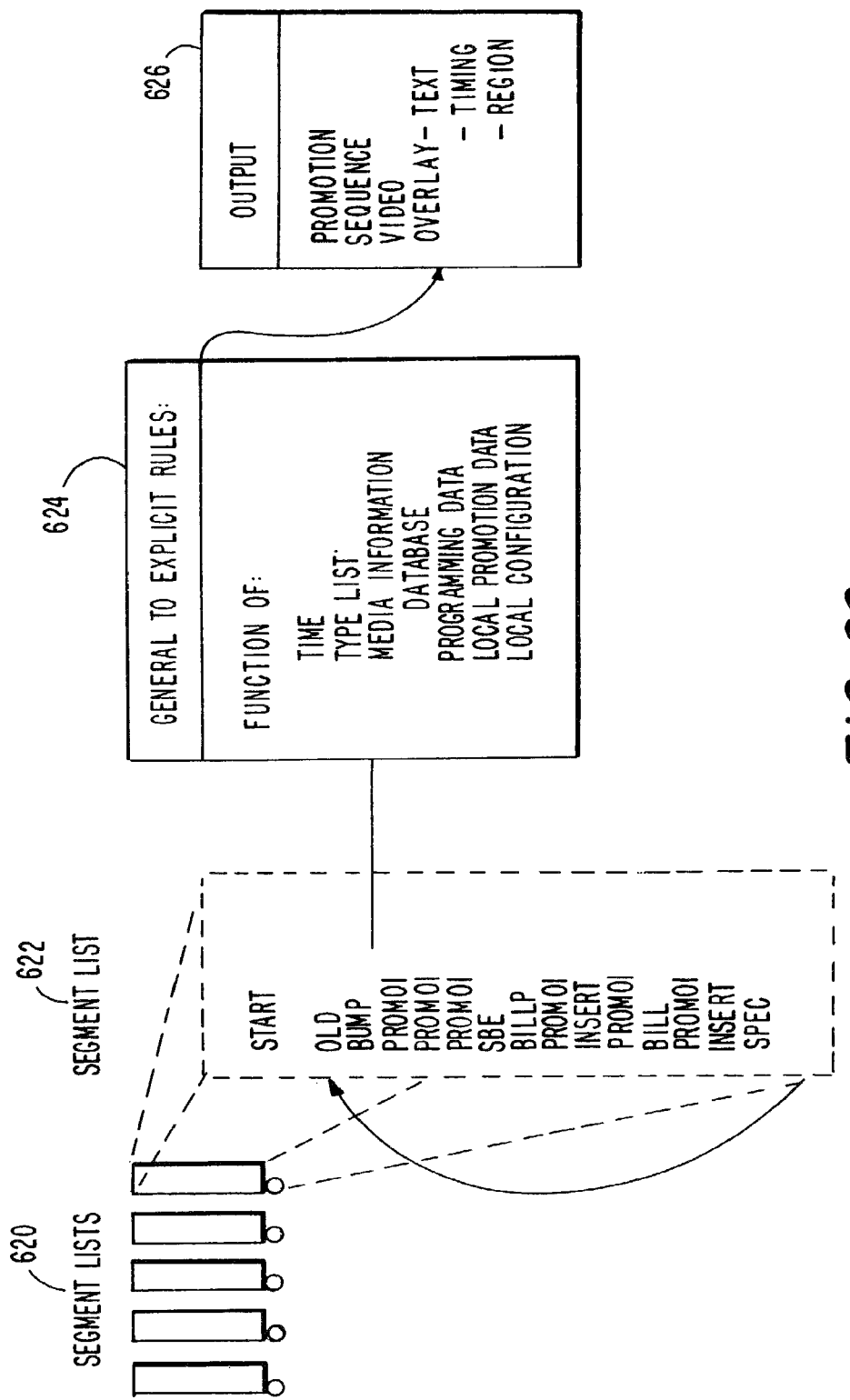
FIG. 20 is an illustration of a scheduling process of the multimedia distribution and broadcast system of the present invention to convert the implicit schedule of FIG. 20 into an explicit schedule.

Referring to FIG. 20, scheduling functions to assign explicit video, audio, text, background or multimedia elements to broadcast on at a specific time are illustrated. In other words, the scheduling rules are used to transform the implicit schedule 608 shown in FIG. 19 into an explicit schedule with specific titles of video, audio, text, background or other multimedia elements which can be retrieved from the downlink database 130 (FIG. 3) to generate multimedia sequences to be broadcast to viewers. After building the implicit schedule 608 (FIG. 19), the downlink computer 130 (FIG. 3) selects one of the segment lists 620 that satisfies the type constraint 610 (FIG. 19) and time constraints 612 and 614 (FIG. 19) in the implicit schedule 608 (FIG. 19). The selected segment list 622 stored in the segment definition database 444 (FIG. 11) may be another implicit schedule as shown. Each item in the segment list 622, thereafter, is considered as functions of time, type list, multimedia address such as laser disc number, programming data, local promotion data and local configuration as shown in the table 624. The items, therefore, are converted to a set of multimedia having a particular video, audio and text clips that run for a specified amount of time as showing in the table 626. The downlink computer system 114 (FIG. 1) forms multimedia sequences to be broadcast by forming the sequential sets of multimedia as it goes down the segment list 622.

Figure 21:
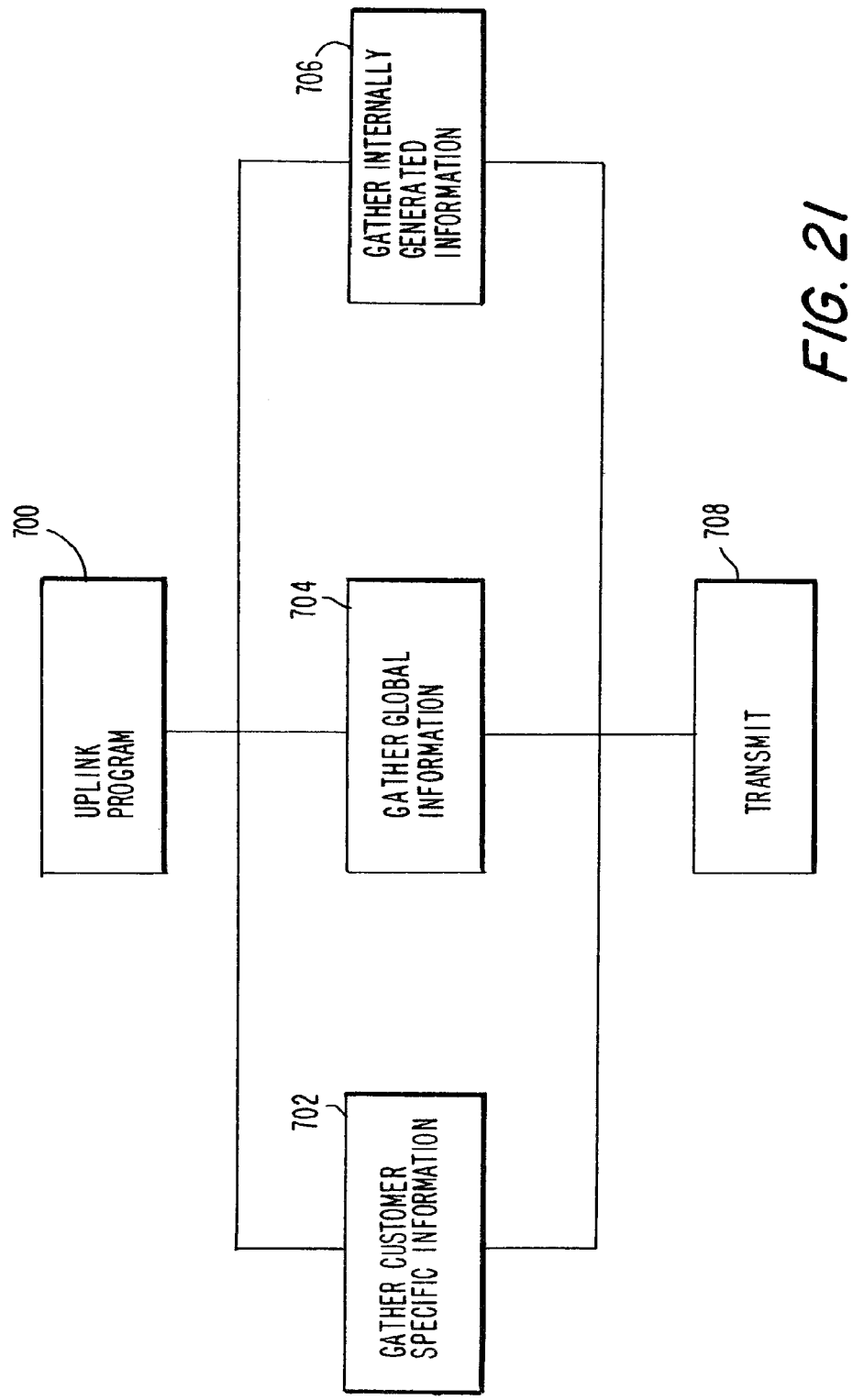
FIG. 21 is a logic flow diagram representing, at a functional level, a control program for implementing the multimedia distribution and broadcast system of the present invention at the central uplink facility.

Referring now to FIG. 21, a logic flow diagram is described which represents the major processes performed by the central uplink facility 102 (FIG. 1). It should be noted that the order of the steps in FIG. 21 is not critical and that the flow diagrams do not necessarily reflect the absolute sequence of actions taken at the central uplink facility 102 (FIG. 1).

The main objective of the program loop 700 performed at the uplink facility 102 (FIG. 1) is to collect various multimedia contents and control information for a satellite transmission to the downlink facility 106 (FIG. 1) so that the downlink computer system 114 (FIG. 1) can evaluate the transmitted multimedia contents and control information to construct multimedia sequences. The program loop 700 utilizes mainly the externally developed information 210 (FIG. 5) and internally developed information 212 (FIG. 5) which are the uplink facility's core data defining the multimedia distribution and broadcast system 100 (FIG. 1). Especially, the internally developed information 212 (FIG. 5) is used by the central uplink facility 102 (FIG. 1) to maintain substantial control over the contents and display arrangements of the multimedia sequences generated at the remote downlink facility 106 (FIG. 1). Other information contained in the uplink database 122 (FIG. 2) provides the support and plumbing for the program loop 700 to run smoothly and efficiently. The program loop 700 is preferably implemented as a collection of subroutine processes which perform the stated functions.

The uplink program loop 700 begins with any of steps 702, 704 and 706. At step 702, the uplink computer system 110 (FIG. 2) performs a gather Customer Specific Info routine in order to collect the data specific to the downlink facility 106 (FIG. 1). The collected data is necessary to provide the remote downlink facility 106 with the multimedia contents and control information tailored to its local market (FIG. 1). Most of the data is received directly from the remote downlink facility 106 (FIG. 1) and stored in the central uplink database 122 (FIG. 2). More specifically, the uplink control unit 120 (FIG. 2) collects the configuration data 272 (FIG. 7), channel lineup data 274 (FIG. 7) customer source data 276 (FIG. 7), viewer information pages 278 (FIG. 7) and local media 280 (FIG. 7) from the remote downlink facility 106 (FIG. 1) by a transmission via the uplink modem 126 (FIG. 2) and a manual input through a keyboard, and stores the collected data in the customer specific information database 234 (FIG. 5).

At step 704, a gather globally generated information routine is invoked to collect the multimedia contents and control information global within the multimedia distribution and broadcast system 100 (FIG. 1). Most often, different downlink facilities follow the same pattern, use the same sources and promote with the same material in their cable services. There is no point in processing thousands of video dips and expensive processes when the difference between them is small. Thus, the uplink computer system 110 (FIG. 1) groups as much information as possible into the global information 236 (FIG. 7) for efficiency. The uplink control unit 122 (FIG. 2) receives the global information from various sources such as network sources, remote downlink facility, video vendors and movie studios and stores the information in the central uplink database 122 (FIG. 2). More specifically, the uplink control unit 122 (FIG. 2), collects the standard title 282 (FIG. 7), source schedule (FIG. 7), global media 286 (FIG. 7) and weather data 288 (FIG. 7) stores the collected data in the global information database 236 (FIG. 5). The Gather Global Information routine completes gaps in the customer specific information by blending the global information 236 (FIG. 7) with the customer specific information 234 (FIG. 7). The gather global information routine creates a complete set of the externally generated information 210 which can be tied to the particular remote downlink facility 106 (FIG. 1).

At step 706, a gather internally generated information routine is invoked to collect the control information that can be derived from the central uplink facility's experiences in providing the multimedia distribution and broadcast service. This control information is a'set of rules that the central uplink facility 102 (FIG. 1) researches and develops so that the remote downlink facility 106 (FIG. 1) can go by this set of rules in constructing a sequence of multimedia. More specifically, the uplink control unit 120 (FIG. 2) collects format definitions 290 (FIG. 8), type definition 292 (FIG. 8), segment definition 294 (FIG. 8), environment definition 276 (FIG. 8), default look 298 (FIG. 8), media constraint 300 (FIG. 8) and event constraint 302 (FIG. 8) and stores the collected data in the internally generated information database 212 (FIG. 5).

At step 708, the collected multimedia contents and control information are transmitted to the remote downlink facility 106 (FIG. 1) where the transmitted data is used to generate multimedia sequences to be broadcast to viewers. Among the contents of the uplink database 122 (FIG. 2), most of the data the DVFS data base 200 (FIG. 4) is transmitted except the process information 208 (FIG. 4). Also, transmitted is the data in the presentation information 202. The rest of the contents in the uplink database 122 (FIG. 2) are not transmitted since the rest exclusively concerns the operations at the uplink facility 102 (FIG. 1).

Referring now to FIGS. 22-31, a series of logic flow diagrams is described which represent at a functional level, a control program executed by the downlink computer system 114 (FIG. 1) for implementing the promotion management of the present invention. Similar to FIG. 21, the order of the steps in FIGS. 22-31 is not critical and an order other than the one shown that can reasonably accomplish the same tasks can be followed.

Figure 22:
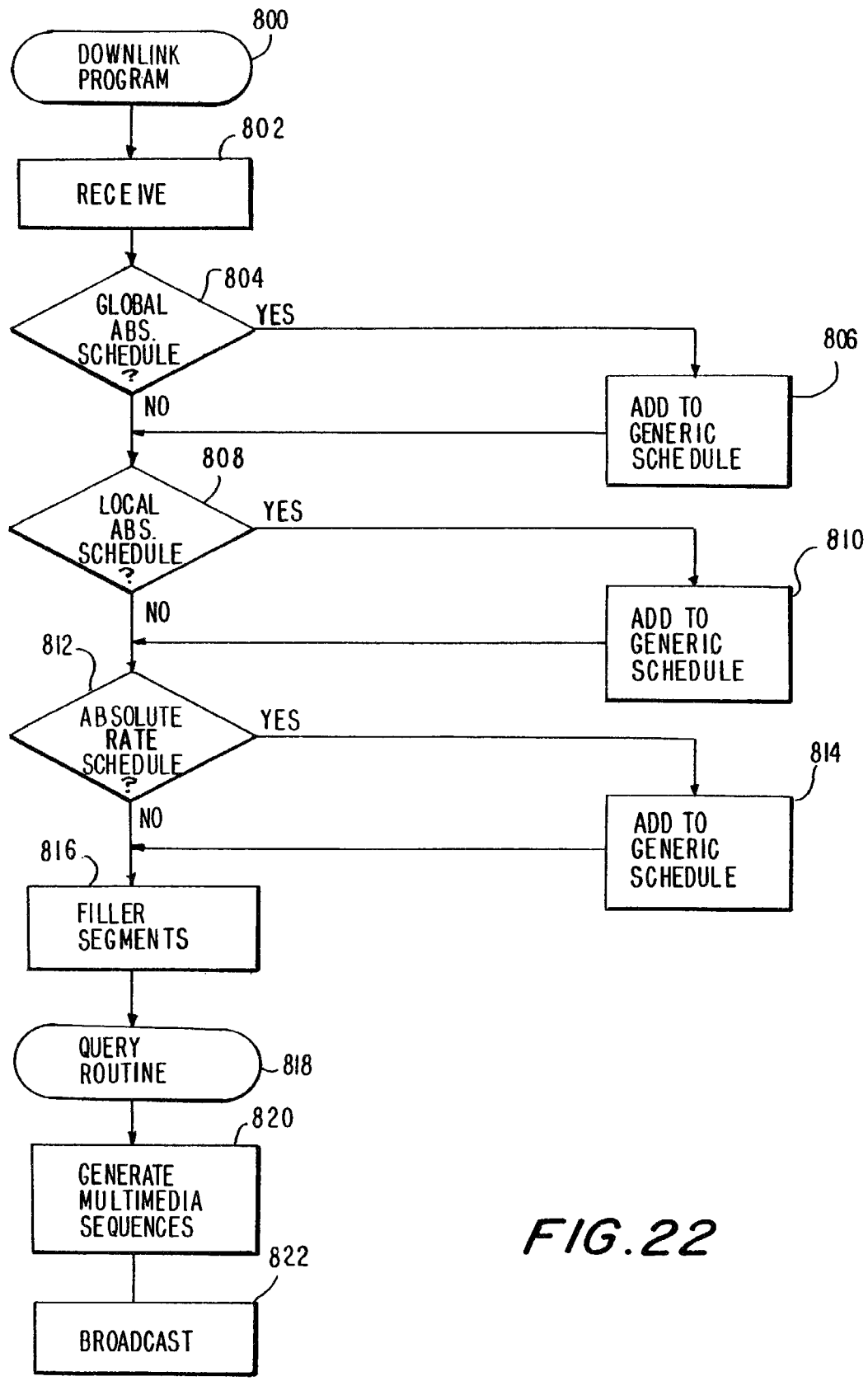
FIGS. 22-32 are logic flow diagrams representing, at a functional level, a control program for implementing the multimedia distribution and broadcast system of the present invention at the cable headend facility.

A downlink program loop 800 is described in connection with FIG. 22. The objective of the main program loop 800 is to produce a sequence of multimedia scheduled at such times as to maximize exposure of promoted events and to provide entertaining screens overlaid with useful information based on the multimedia contents and control information transmitted from the uplink facility 102 (FIG. 1) to the downlink facility 106 (FIG. 1).

The program begins with step 802 by receiving the data transmitted from the central uplink facility 102 (FIG. 1). The satellite receiver 112 (FIG. 1) of the downlink facility 106 (FIG. 1) receives the analog or digital signals from the central uplink facility 102 (FIG. 1) via the satellite 104 (FIG. 1) and passes the signals to the downlink computer system 114 (FIG. 1). In the systems prior art, the satellite transmission was used specifically for time sensitive information such as schedules. The rest of the data such as multimedia contents was stored in data transfer medium such as a laser disc and mailed via a carrier from the central uplink facility 102 (FIG. 1) to the remote downlink facility 106 (FIG. 1). The multimedia distribution and broadcast system 100 (FIG. 1) of the present invention, however, is able to transmit all necessary data to the downlink facility 106 (FIG. 1) via the satellite 104 (FIG. 1) by significantly decreasing the amount of the multimedia contents with the use of notebooks that allow efficient use of the limited multimedia contents. The notebooks themselves have smaller data size in comparison to the multimedia contents. Thus, the central uplink facility 102 (FIG. 1) transmit most of all of the data to the satellite 104 and avoid the more complex two-tier delivery system using the mail delivery.

The transmitted signals may be selectively received at the downlink facility 106 (FIG. 1) based upon the identification of the downlink facility 106 (FIG. 1). This identification of the downlink facility 106 (FIG. 1) is included in the transmission signals. Since the bulk of the transmitted signals is unnecessary information for the other downlink facilities, this selection process drastically conserves mass storage and transmission resources. The selected or filtered information is demodulated at a demodulator 126 (FIG. 3) and stored in the downlink database 130 (FIG. 3) by the downlink control unit 128 (FIG. 3).

After step 802, the downlink control unit 128 (FIG. 3) proceeds to construct a schedule for multimedia sequences based on the control information now stored in the downlink database 130 (FIG. 3). The downlink control unit 128 (FIG. 3) first determines if there is a global absolute schedule 600 (FIG. 18) to be incorporated into the schedule at test 804. For example, if the downlink control unit 128 (FIG. 3) detects any national advertisement that is required to be put on every downlink facility's schedule, the conditions for such national advertisements such as the genre and date information are incorporated into the schedule at step 806. The downlink control unit 128 (FIG. 3) then proceeds to test 808 to determine if there is a local absolute schedule 602 (FIG. 18). For example, if any local advertisement requested from the remote downlink facility 106 (FIG. 1) is detected, the time and date conditions for such local advertisements are incorporated into the available slots in the schedule at step 810. The downlink control unit 128 (FIG. 3) also determines if there is an absolute rate schedule 604 (FIG. 18) to be incorporated into the schedule at test 812. If a special event that needs to be promoted at a certain rate is detected, the downlink control unit 128 (FIG. 3) incorporates the conditions for such promotions into the schedule at step 814. For example, the absolute rate schedule 604 (FIG. 18) may specify the rate of specific types of promotions, such as sporting events, to be shown on a particular channel a certain number of times during a particular period of time. The incorporation of the global absolute schedule 600 (FIG. 18), local absolute schedule 602 (FIG. 18) and absolute rate schedule 604 (FIG. 18) at steps 806, 808 and 810 create a schedule with some gaps. The downlink control unit 128 (FIG. 3) then fills these gaps in the schedule with filler segments 606 (FIG. 18) at step 616. The downlink control unit 128 (FIG. 3) uses a mixture of configuration controls and segment lists to fill in these gaps to generate the implicit schedule 608 (FIG. 19).

At step 818, the downlink control unit 128 (FIG. 3) performs a series of tests and steps to implement a query routine in order to transform the implicit schedule 608 (FIG. 19) from step 816 into an explicit schedule. The query routine 818 thus selects the multimedia contents and notebooks to be used. The downlink control unit 128 (FIG. 3) subsequently generates multimedia sequences based on the explicit schedule and selected multimedia contents and notebooks at step 820. The downlink control unit 128 (FIG. 3) synchronizes the multimedia sequences for broadcasting and the channel modulator 112 (FIG. 3) broadcasts the synchronized multimedia sequences at step 822.

Figure 23:
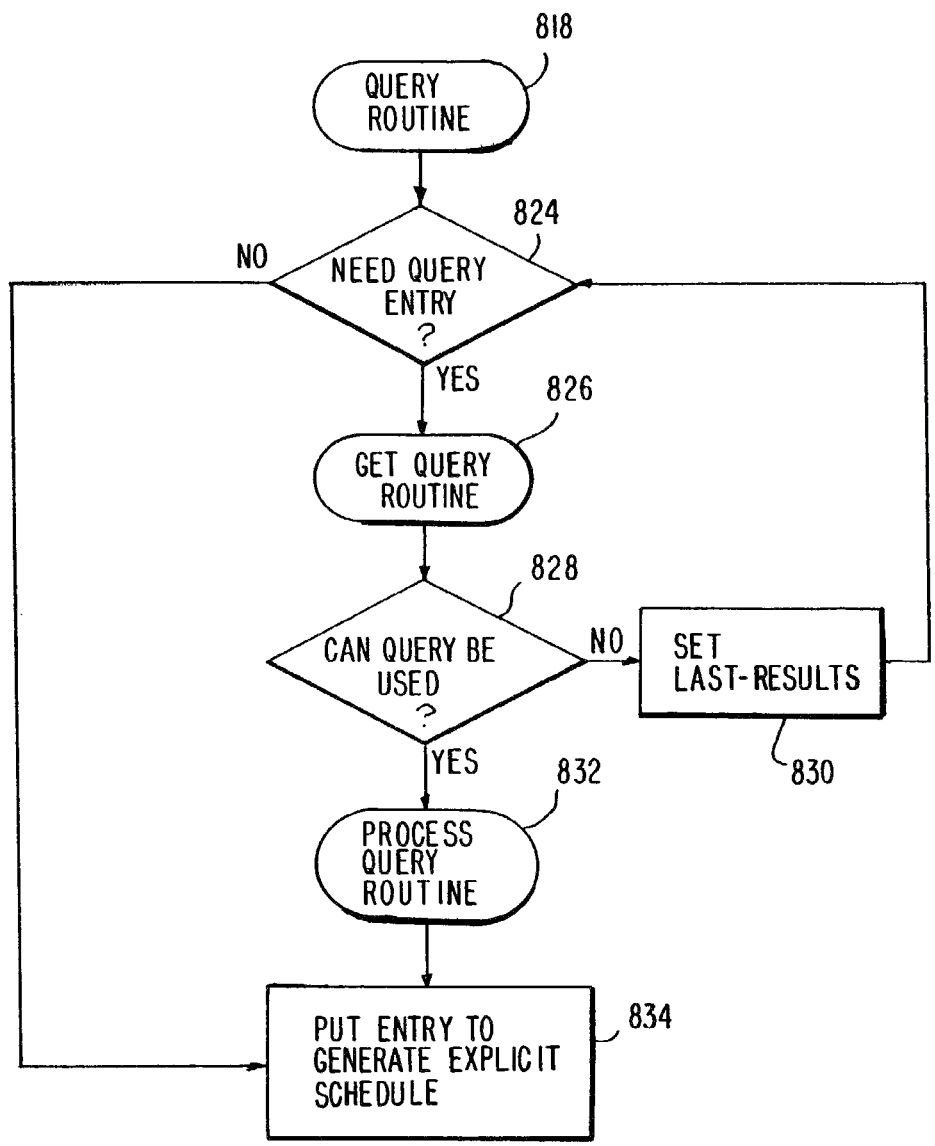

Referring to FIG. 23, the query routine 818 performed by the downlink computer 110 is illustrated in more detail (FIG. 1). When the query routine 818 is invoked, a series of steps and tests are performed to transform an implicit schedule into an explicit schedule.

The downlink control unit 128 (FIG. 3) determines at test 824 whether a queue entry is needed to convert an implicit schedule 608 (FIG. 19) to an explicit schedule with specified multimedia contents and notebooks. If the schedule is explicit already, the downlink control unit 128 (FIG. 3) terminates the query routine 818 and places the entry including the specified multimedia contents and notebooks at step 834. Otherwise, a get query routine 826 is invoked where the type definition 442 (FIG. 11) and environmental definition 446 (FIG. 11) are accessed to retrieve necessary queries. These queries are generally predefined by the central uplink facility 102 (FIG. 1) and configured to find appropriate multimedia contents and notebooks. Examples of these queries are a set of conditions requesting a 30-second video clip about a wrestling match to be played at channel 60 of the cable service. These queries are developed with consideration of the general needs of the remote downlink facility 106 (FIG. 1). After the get query routine 826, the downlink control unit 128 (FIG. 3) determines if the returned query can be used at test 828. If not, the downlink control unit 128 (FIG. 3) sets the last results in the previous query request at step 830 and loops back to test 824.

If it is determined that the returned query can be used at test 828, a process query routine 832 is invoked to find an appropriate entry of multimedia contents and notebooks. When the process query routine 832 returns the entry at step 834, the downlink control unit 128 (FIG. 3) places the returned entry to generate the explicit schedule at step 834.

Figure 24:
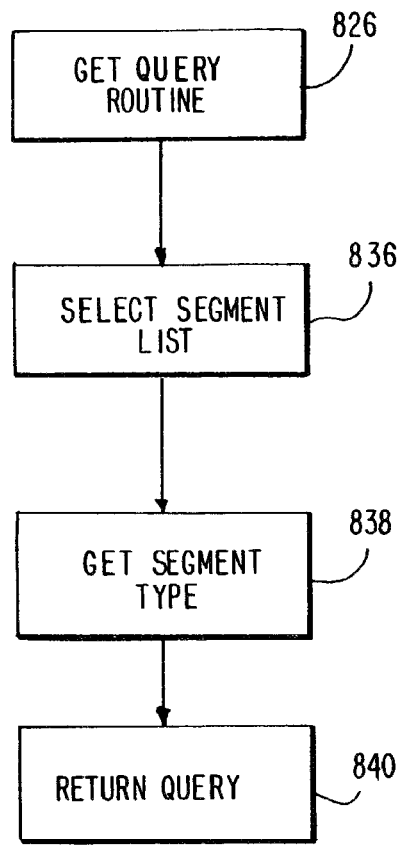

FIG. 24 represents the get query routine 826. In the get query routine 826, the downlink control unit 128 (FIG. 3) selects a segment list 620 (FIG. 20) at step 836 based on the conditions as defined by the implicit schedule 610 (FIG. 19), local data and configuration of the downlink facility 106 (FIG. 1).

The segment list 622 (FIG. 20) may contain multiple segments or a single segment which is function of time, a type list, local promotion data, local configuration, EPG data, a script object list or a video disk. The segment list 622 (FIG. 20), for example, may be a sports segment that includes an opening, closing and a certain number of sports video clips. The downlink control unit 128 (FIG. 3) determines at step 838 the segment type from the selected segment list 622 (FIG. 20). Based on the selected type, the downlink control unit 128 (FIG. 3) formulates and returns a query at step 840.

FIGS. 25-31 represent an exemplary embodiment for the process query routine 832 which is performed by the downlink control unit 128 (FIG. 3). An alternative and more general embodiment for the process query routine 832 is described herein below in reference to FIG. 32.

Figure 25:
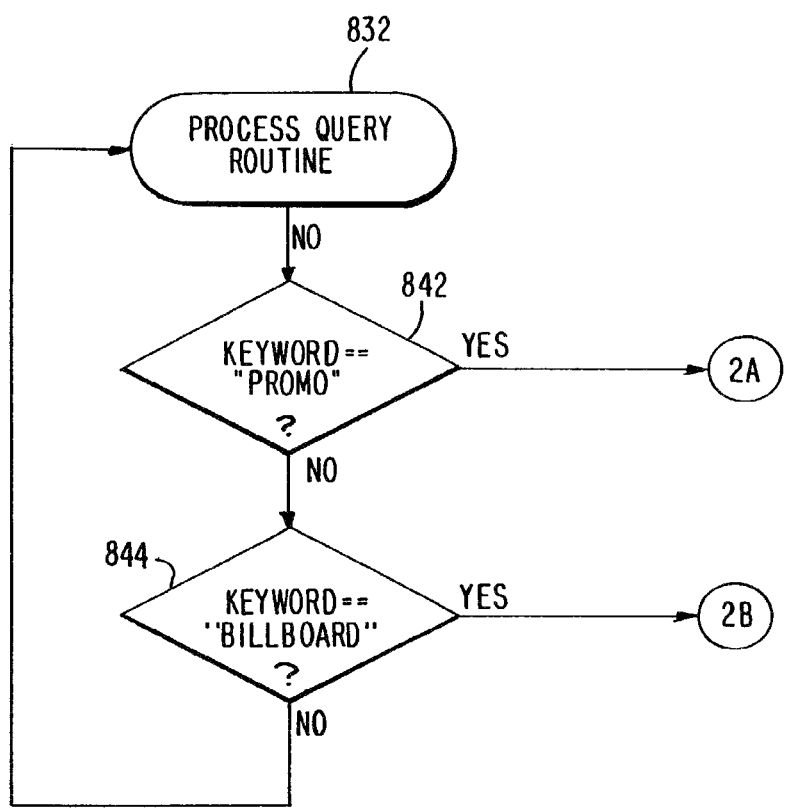
Figure 26:
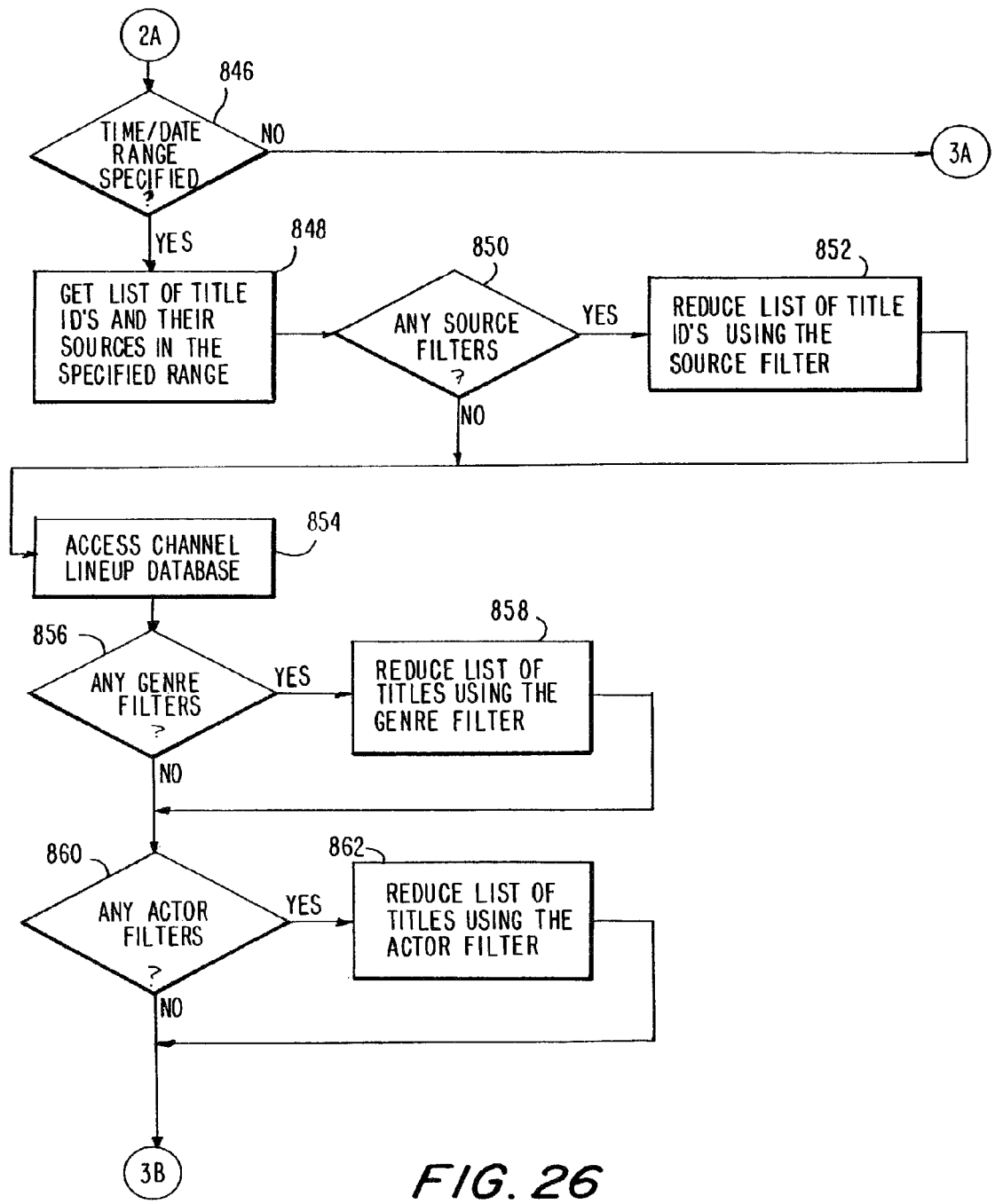
Figure 27:
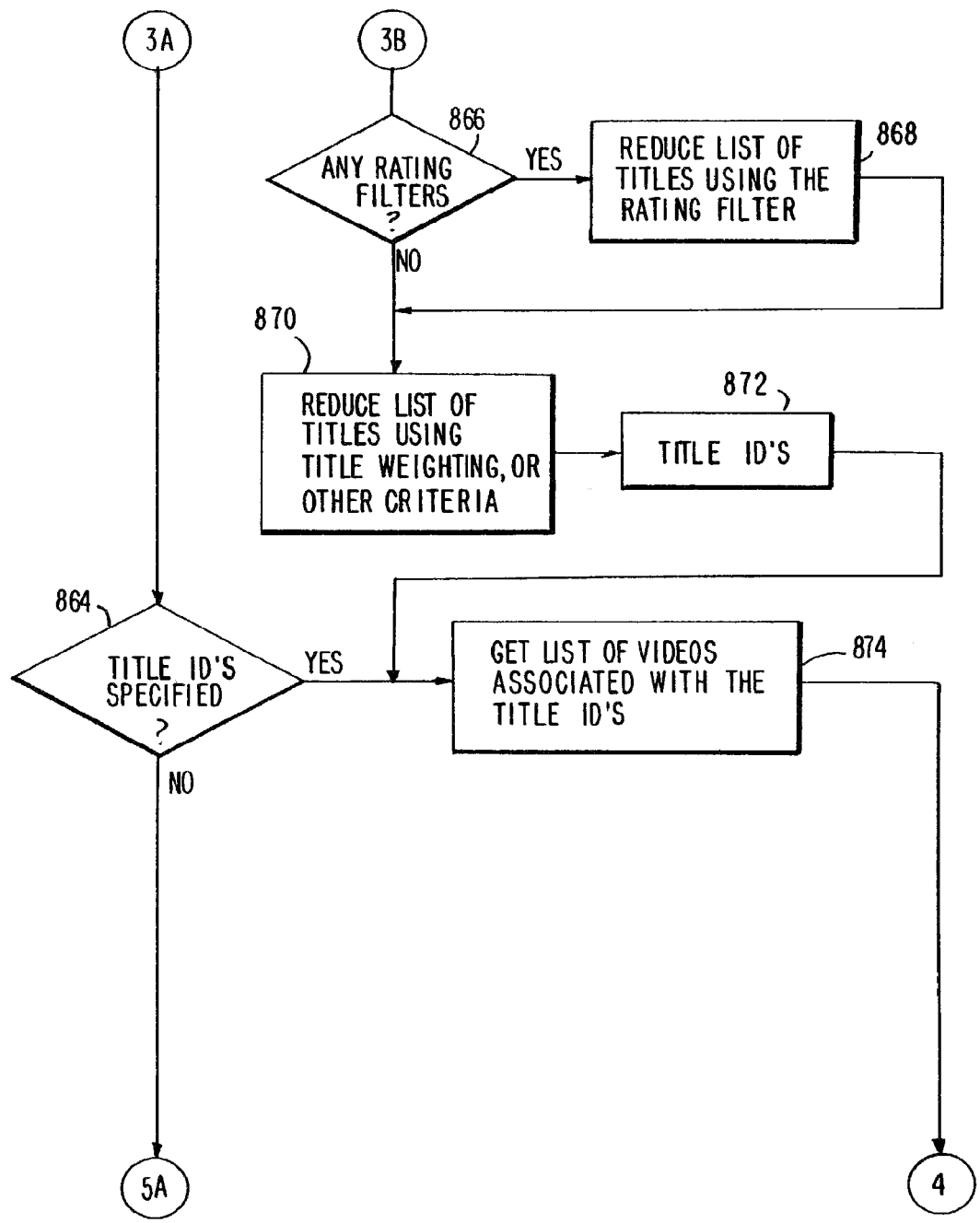

Referring to FIG. 25, the downlink control unit 128 (FIG. 3) proceeds to determine whether the keyword contained in the query is a "promotion" at test 842. If it is determined that the keyword is promotion, then the downlink control unit 128 (FIG. 3) proceeds to find an appropriate promotion that satisfies the conditions of the query as described in greater detail in relation to FIGS. 26-30. If not, the downlink control unit 128 (FIG. 3) proceeds to determine whether the key word contained in the query is a "billboard" at test 844. If it is determined that the keyword is billboard, then the downlink control unit 128 (FIG. 3) proceeds to find an appropriate background that satisfies the conditions of the query, as described in greater detail in relation to FIG. 31. Thereafter, the downlink control unit 128 (FIG. 3) loops back to step 832 for another request for the process query routine 832.

Referring to FIGS. 26-30, the downlink control unit 128 (FIG. 3) determines at test 846 whether a time and date range for multimedia sequences is specified. If not, the downlink control unit 128 (FIG. 3) proceeds to test 468 for specified title identifications of events. Otherwise, the downlink control unit 128 (FIG. 3) accesses the promotion sequence rule 436 (FIG. 11) in the downlink database 130 at step 848 to retrieve a list of title identifications and their sources which fall within the specified date and time range.

At step 850, the downlink control unit 128 (FIG. 3) determines if there are any source filters to be applied to the list resulting from step 848. The filters are generally used to screen out any of multimedia contents or events from the list using the characteristics or attributes of each multimedia clip or event. If there exists any source filter, the downlink control unit 128 (FIG. 3) reduces the list of title identifications using the source filters at step 852. The source filter, for example, may screen out the title identifications of the events related to HBO and SHOWTIME.

If no source filter is found at test 850 or after reduction of the list at step 852, the downlink control unit 128 (FIG. 3) accesses the channel lineup database at step 854 and proceeds to test 856. At test 856, the downlink control unit 128 (FIG. 3) determines if any genre filters exist in the downlink database 130 (FIG. 3). Examples of genre are sports, movies, shows and special events. If genre filters exist, the downlink control unit 128 (FIG. 3) applies the genre filters to reduce the list of title identifications based on the categories of the promotions at step 856.

If no genre filter is found at test 856 or after the reduction of the list at step 858, the downlink control unit 128 (FIG. 3) determines at test 860 if any actor filter exists in the downlink database 130 (FIG. 3). The actor filter, for example, is used to select only the movies with John Wayne in them. The actor filter may be further used to select the movies with John Wayne starring or supporting in them. If there is any actor filter, the downlink control unit 128 (FIG. 3) applies the actor filter to reduce the list of title identifications by eliminating the promotions that do not feature particular actors at step 862.

The downlink control unit 128 (FIG. 3) determines at test 866 if any rating filter exists in the downlink database 130 (FIG. 3). The rating filter may be used to select only the movies with PG-13 rating for children. If so, the downlink control unit 128 (FIG. 3) applies the rating filter to the list of title identifications and eliminates the multimedia contents that do not have specified ratings at step 868.

If no rating filter is found at test 866 or after the reduction of the list at step 868, the downlink control unit 128 (FIG. 3) reduces the list of title identifications by a title weighting criterion or other filtering available at step 870. The filtering and title weighting steps 848, 852, 858, 862, 868 and 870 thus produce a set of title identifications at step 872. For example, if the downlink control unit 128 (FIG. 3) applies the criteria for the up-next lineup of the screen 500 as shown in FIG. 12, the title identifications would include "Crimson Tide," "The Santa Clause" and "Batman Forever."

If it is determined that the set of title identifications is not specified at test 864, the downlink control unit 128 (FIG. 3) proceeds to test 890 to see whether a set of video specifications exists. If a set of title identifications is specified at test 864 or after the selection of title identifications at step 872, the downlink control unit 128 (FIG. 3) retrieves the list of videos from local media 426 (FIG. 10) and global media (FIG. 10) in the downlink database 130 (FIG. 3), that are linked to the specified set of title identifications at step 874.

Figure 28:
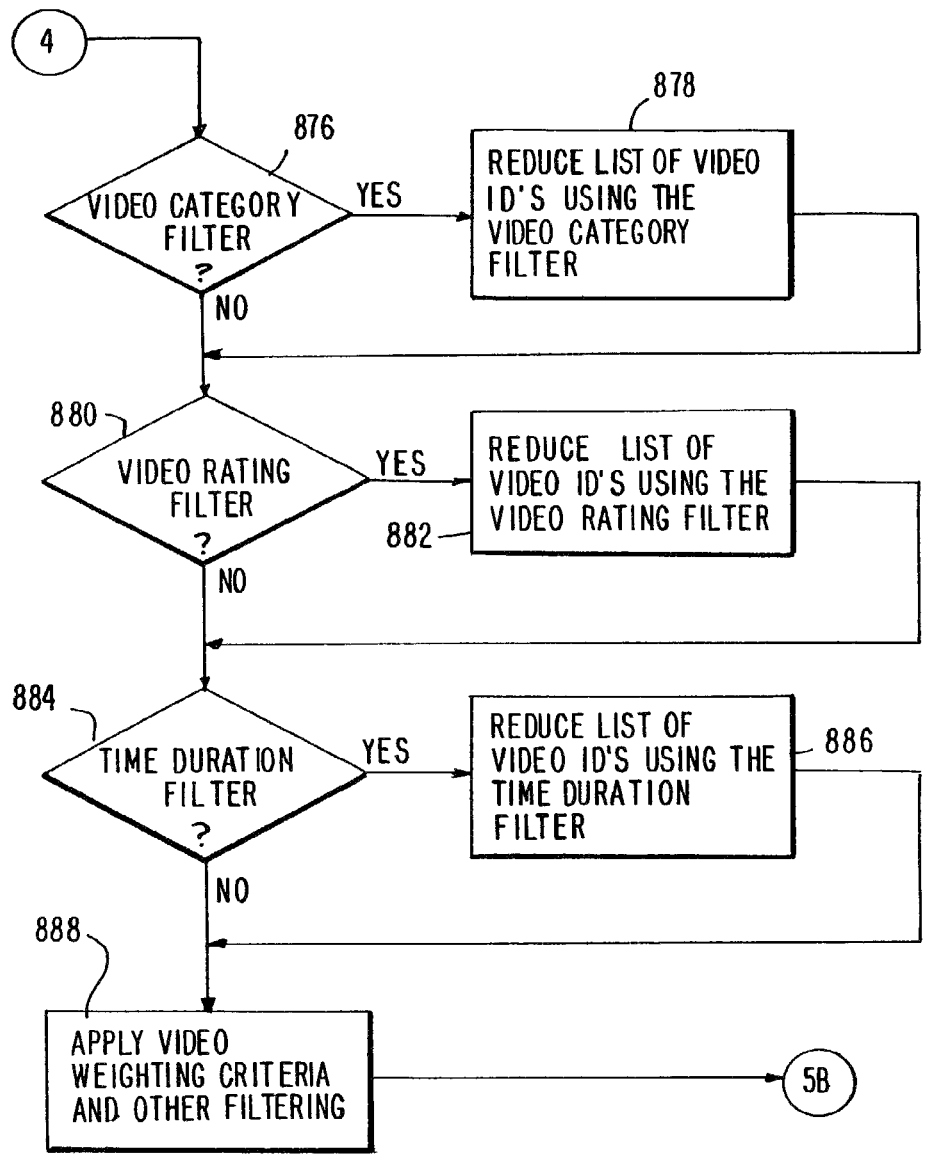

Referring to FIG. 28, the downlink control unit 128 (FIG. 3) at step 876 determines if there are any video category filters to be applied to the list of videos selected at step 874. Similar to genre filters, examples of video categories are sports, movies, shows and special events. The video category filters are used to utilize these characteristics of video for selecting only desired videos. If so, the downlink control unit 128 (FIG. 3) reduces the list of title identifications using the video category filters at step 878.

If no video category filter is found at test 880 or after reduction of the list at step 878, the downlink control unit 128 (FIG. 3) accesses the downlink database 130 and determines if any video rating filters exist in the downlink database 130 (FIG. 3) at test 882. If so, the downlink control unit 128 (FIG. 3) applies the video rating filters to reduce the list of video identifications based on the ratings of promotional videos at step 884.

If no video rating filter is found at test 880 or after the reduction of the list at step 882, the downlink control unit 128 (FIG. 3) proceeds to test 884 to determine if any time duration filters exist in the downlink database 130 (FIG. 3). The time duration filters, for example, is used to select only the videos having 30 second duration. If the time duration filters exist, the downlink control unit 128 (FIG. 3) applies the time duration filters to reduce the list of video identifications at step 886. If no time duration filter is found at test 884 or after the reduction of the list at step 886, the downlink control unit 128 (FIG. 3) further applies any filter and video weighting criteria available to the list of video identifications to reduce the list of video identifications at step 888. The filtering and title weighing steps 876, 880, 884 and 888 produce the identifications of the videos associated with each of the title identifications.

Figure 29:
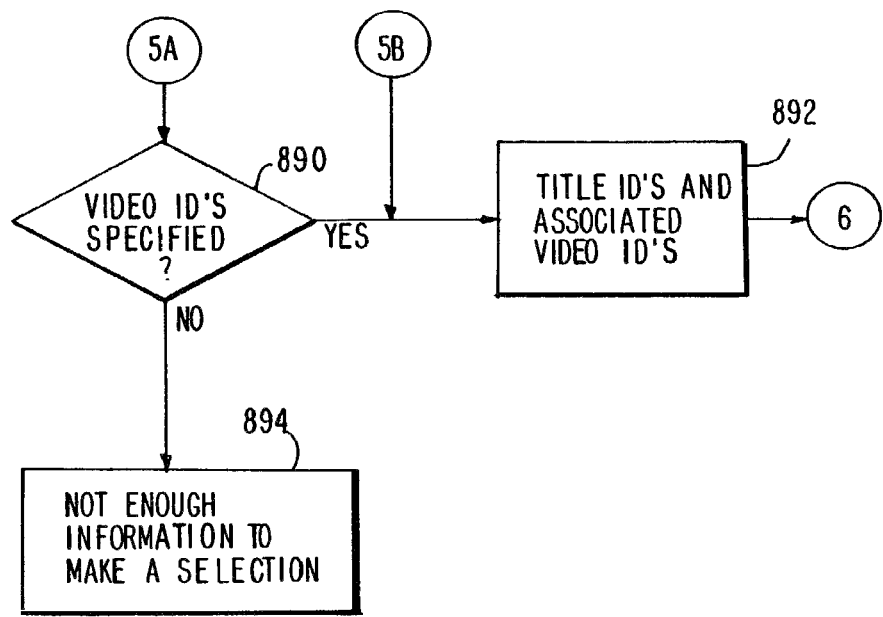
Figure 30:
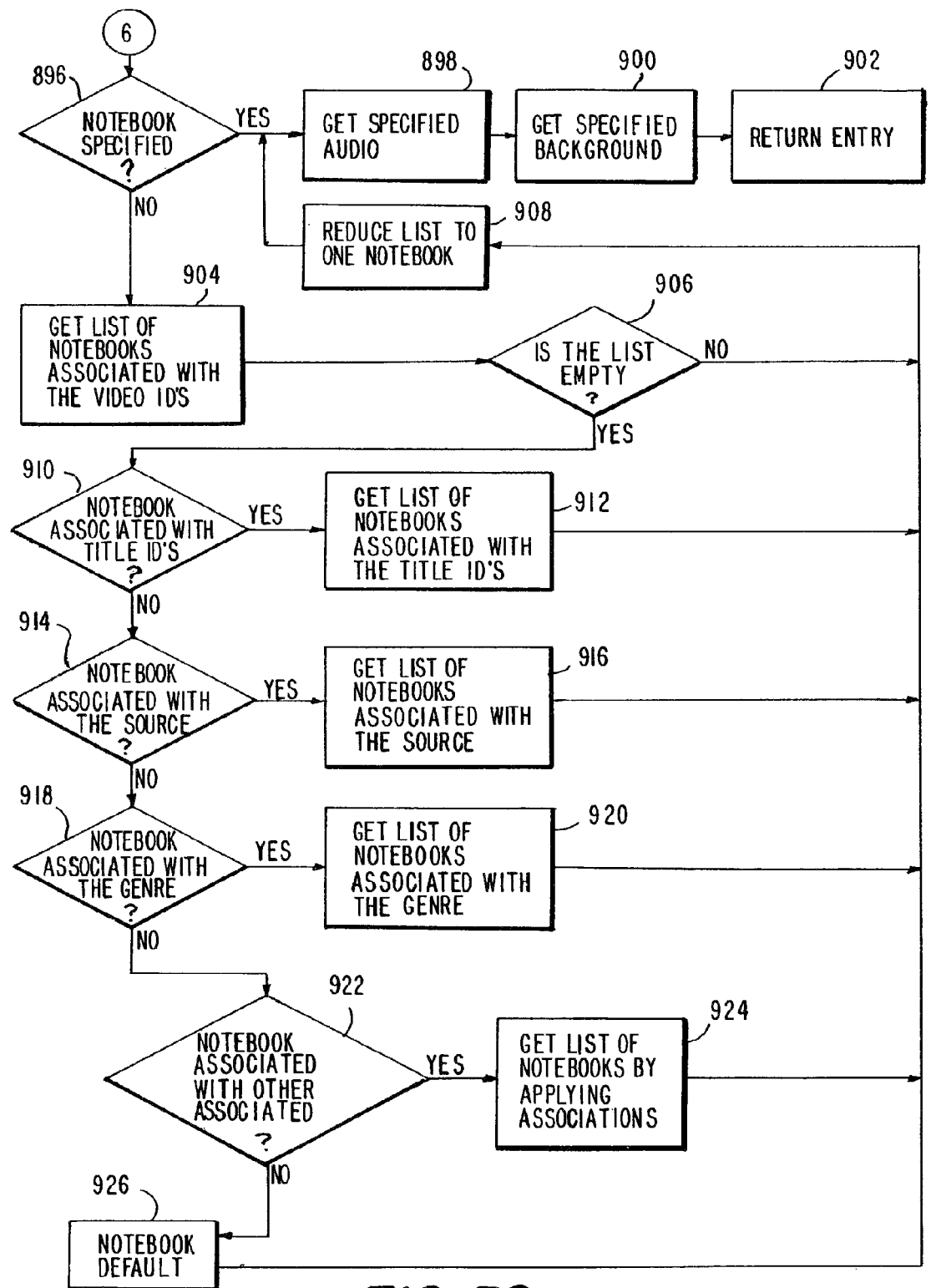

Referring to FIG. 29, if it is determined that video identifications are not specified at test 890, the downlink control unit 128 (FIG. 3) proceeds to step 894 and concludes that selection of promotional videos cannot be made based on given information. If video identifications are specified at test 890 or after the reduction of the list of videos at step 888, a set of videos linked to the specified title identifications is established at step 892. For example, the set of videos for the up-next screen 500 in FIG. 12 would contain the video clip for each of the three movies, "Crimson Tide," "The Santa Clause" and "Batman Forever."

The downlink control unit 128 (FIG. 3) then proceeds to test 896 (FIG. 21) and determines if a notebook is specified in the downlink database 130 (FIG. 3). If a notebook is specified, then the entry including the set of title and video identifications, the single notebook identification, specified audio from step 898, and specified background from step 900 is returned at step 902. The returned entry is subsequently put in the explicit schedule at step 834 (FIG. 14). If it is determined that the notebook is not specified, the downlink control unit 128 (FIG. 3) accesses the downlink database 130 (FIG. 3) to retrieve a list of notebooks associated with the particular video identifications determined at step 904. The downlink control unit 128 (FIG. 3) determines if such lists contain any notebooks at test 906. If it is found that the list contains notebooks, i.e., the list is not empty, the downlink control unit 128 (FIG. 3) proceeds to step 908 to reduce the list to a single notebook by using a filter, a weighting criterion or simply the order of the list. If it is round that the list does not contain any notebook, i.e., the list is empty, the downlink control unit 128 (FIG. 3) proceeds to test 910 to determine if there are notebooks associated with the title identifications. If it is found such notebooks exist, the list of the notebooks is retrieved at step 912 and the downlink control unit 128 (FIG. 3) proceeds to step 908. Otherwise, the downlink control unit 128 (FIG. 3) proceeds to test 914 to determine if there are notebooks associated with the sources of the title identifications. If it is found such notebooks exist, the list of the notebooks is retrieved at step 916 and the downlink control unit 128 (FIG. 3) proceeds to step 908. Otherwise, the downlink control unit 128 (FIG. 3) proceeds to test 918 to determine if there are notebooks associated with the genre. If it is found such notebooks exist, the list of the notebooks is retrieved at step 920 and the downlink control unit 128 (FIG. 3) proceeds to step 908. Otherwise, the downlink control unit 128 (FIG. 3) proceeds to test 922. If there are any other associations to notebooks, the downlink control unit 128 (FIG. 3) applies such associations to retrieve a list of notebooks at step 924 and the downlink control unit 128 (FIG. 3) proceeds to step 908. If not, the downlink control unit 128 (FIG. 3) applies a default notebook at step 926.

At step 908, the downlink control unit 128 (FIG. 3) applies various rules as described above to the list received from steps 906, 912, 916, 920 and 924 and reduces the list to a single notebook. This single notebook with specified audio retrieval at step 898 and specified background at step 900 become the return entry at step 902. Alternatively, the audio and background may be obtained by evaluating constraints contained in the queries just as how the titles, videos and notebooks have been obtained.

Figure 31:
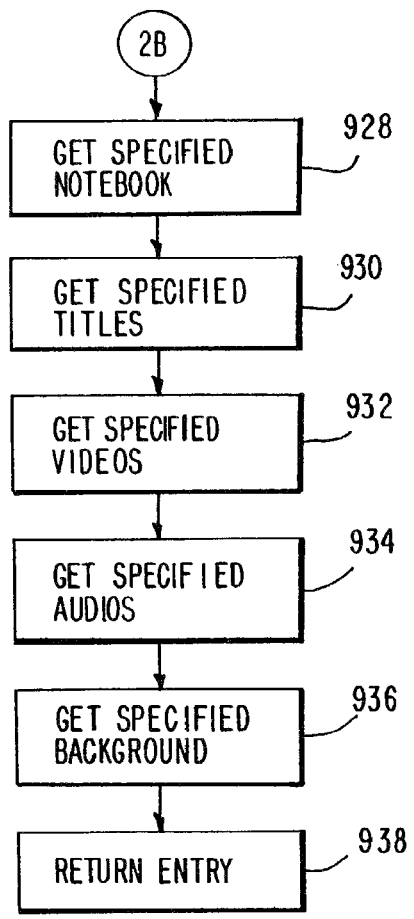

FIG. 31 represents the processes to construct a billboard that has no association with any event. When a keyword is a "billboard" at test 844 (FIG. 25), the downlink control unit 128 (FIG. 3) proceeds to retrieve from the presentation information 404 in the downlink database 130 (FIG. 3) the specified notebooks at step 928. After step 928, the downlink control unit 128 (FIG. 3) retrieves specified titles at step 930. Next, the downlink control unit 128 (FIG. 2) retrieves specified videos at step 932. Following step 932, the downlink control unit 128 (FIG. 2.) retrieves specified audio at step 934. Subsequent to 934, the downlink control unit 128 (FIG. 2) retrieves a specified background at step 936. Finally at step 938, the downlink control unit 128 (FIG. 2) returns to step 834 (FIG. 23) with the entry of the specified notebook, title, video, audio and background.

Figure 32:
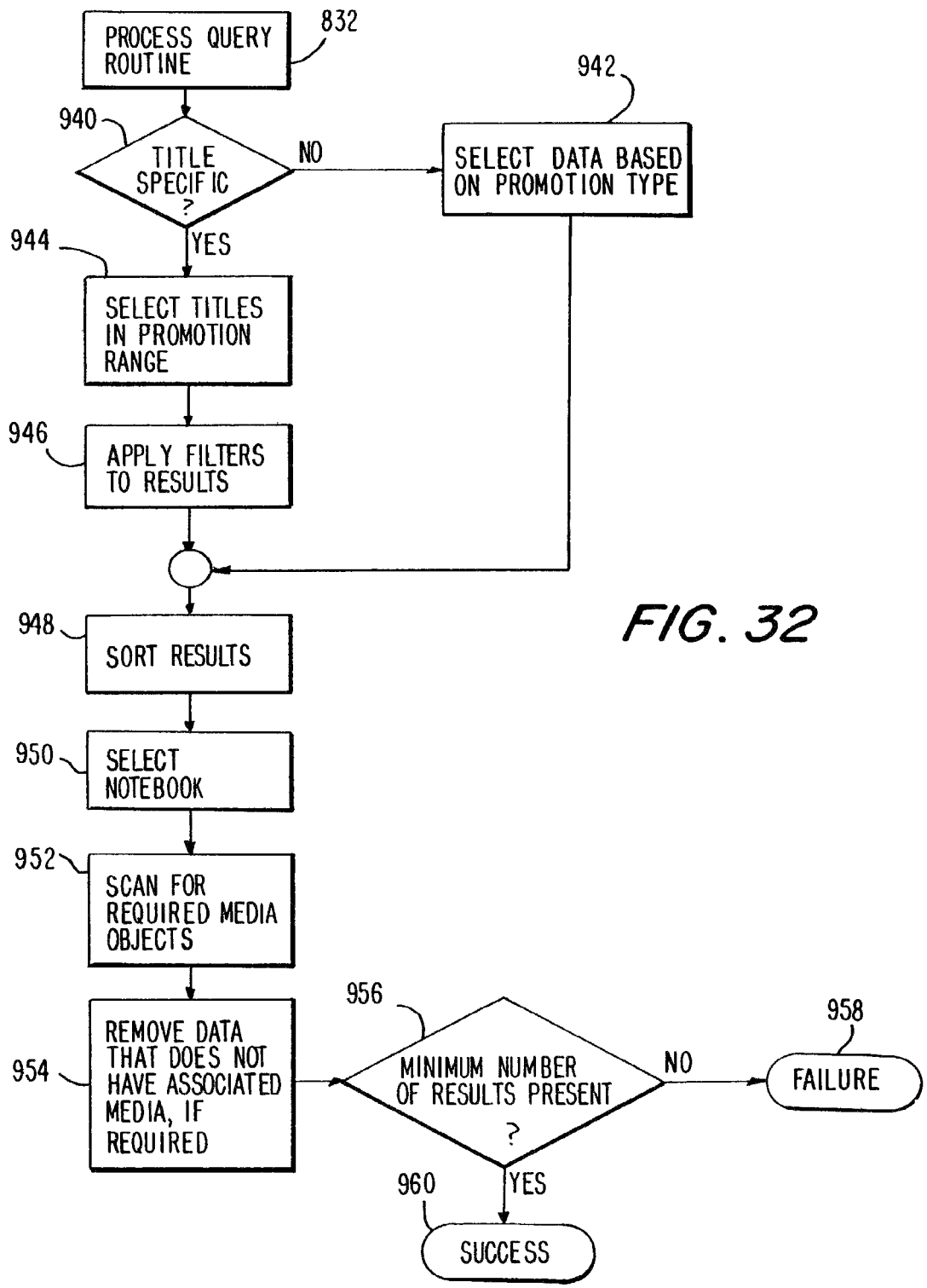

FIG. 32 represents an alternative embodiment for the process query routine 832 which is more general than the exemplary embodiment discussed in reference to FIGS. 25-31. From the query obtained from step 840 (FIG. 24) of the get query routine 826 (FIG. 23) and tested at step 828 (FIG. 23), the downlink control unit 128 (FIG. 3) in step 940 determines if the query is title specific. In order to determine whether the query is title specific, the downlink control unit 128 (FIG. 3) accesses the promotion sequence rule 110 (FIG. 9) in the downlink database 130 (FIG. 3). For example, the query contains a keyword "title" which may be set to a specific title or no title.

If title is not specific, i.e. "title=non" in the query, then the downlink control unit 128 (FIG. 3) in step 942 selects multimedia elements based on a promotion type specified in the query. The query may have a keyword "base type" that can be set to various promotion types 610 (FIG. 19). The base type, for example, can be set to "bumper" which is a video clip that advertises the promotional video service (e.g., "Sneak Prevue") on which the bumper is being provided. In order to select the multimedia based on the promotion type, the downlink control unit 128 (FIG. 3) accesses the local media 426 (FIG. 10) and global media 432 (FIG. 10) of the downlink database 130 (FIG. 3). The bumper would be found in the global media 432 (FIG. 10). An example of multimedia to be found in the local media 426 (FIG. 10) is "retail" which is a video clip specifically designed to promote the programs of multiple system operators such as TCI of Tulsa or Time Warner of New York.

If title is determined to be specific in step 940, the downlink control unit 128 (FIG. 3) in step 944 screens out some of these specified titles based on a promotion range. The promotion range, for example, may be set "from thirty minutes to two hours." The downlink control unit 128 (FIG. 3) accesses the standard title 428 (FIG. 10) and selects titles of events that fall into this time range. The downlink control unit 128 (FIG. 3) also accesses the configurations 418 (FIG. 10) or source schedule 430 (FIG. 10) in order to select titles in promotion range. For example, the channel lineup 420 (FIG. 10) provides the list of sources such as HBO and Cinemax to run step 944 and sources' respective channel numbers, while the source schedule 430 (FIG. 10) provides information about the availability of titles from a particular source at a particular time.

In step 946, the downlink control unit 128 (FIG. 3) applies filters to further select the titles. The query, for example, may contain a filter selecting only the first showing of a movie referred to as a "premiering". The downlink control unit 128 (FIG. 3) applies these filters for filtering out every title except the ones related to premiering. In another instance, the query may contain filters requiring sports events, movies starring John Wayne, or movies having a rating of above PG-13. Yet another example is a daytime filter to be effective only during the daytime for filtering out titles of events that are not suited to children. Similar to step 944 the downlink control unit 128 (FIG. 3) in step 946 accesses the configuration 418 (FIG. 10), channel lineup 420 (FIG. 10), customer source 422 (FIG. 10), standard title 428 (FIG. 10) and source schedule 430 (FIG. 10). In addition, the downlink control unit 128 (FIG. 3) in step 946 utilizes the data from the query generated in step 840.

In step 948, the downlink control unit 128 (FIG. 3) sorts the results from step 946. For example, the results may be sorted by the time to be aired, the channel or the time of the last promotion. More specifically, the downlink control unit 128 (FIG. 3) accesses the standard title 428 (FIG. 10) and utilizes the field contained in each title for sorting. The downlink control unit 128 (FIG. 3) accesses the global media 432 (FIG. 10) in the downlink database 130 (FIG. 3), which contains notebooks in addition to video, audio and bitmaps.

In step 952, the downlink control unit 128 (FIG. 3) scans the selected notebooks from step 950 and scans the downlink database 130 (FIG. 3) for the media objects required by the selected notebooks. More particularly the downlink control unit 128 (FIG. 3) searches the global media 432 (FIG. 10) and local media 426 (FIG. 10) to locate, for example, required audio and bitmap pieces.

In step 954, the downlink control unit 128 (FIG. 3) removes all those titles that do not have the required media objects. For example, if the title is related to a notebook whose audio clip is not present in the global media 432 (FIG. 10), the downlink control unit 128 (FIG. 3) removes that title from the list of available titles.

In step 956, the downlink, control unit 128 (FIG. 3) determines if the minimum number of the titles required for a particular query is met. For example, the query obtained from step 840 (FIG. 24) may specify that three titles are required. The downlink control unit 128 (FIG. 3) determines whether the number of available titles after step 954 is more than three as required by the query.

If the minimum number is not met, the downlink control unit 128 (FIG. 3) in step 958 indicates the failure of the process query routine 832 to an operator on the service monitor 129 (FIG. 3) at the downlink computer system 114 (FIG. 1).

If the minimum number of titles are determined to be available, the downlink control unit 128 (FIG. 3) in step 960 may prompt a success message to an operator. The downlink control unit 128 (FIG. 3) also returns the available titles responsive to the query back to the step 834 (FIG. 23) in order to generate an explicit schedule.

Flexibility and customizing capability of the multimedia distribution and broadcast system 100 (FIG. 1) of this invention enable an effective scheduling of multimedia sequences with desired display arrangements. The timely and entertaining information provided to viewers by the multimedia distribution and broadcast system 100 (FIG. 1) contributes to an increased revenue stream to the remote downlink facility 106 (FIG. 1).

Although the present invention has been described in the context of a promotional video service, it should be understood that the principles of the invention may be used in other contexts. For example, the present invention may be used to deliver a program guide that has various multimedia components, such as textual program listings, and video clips, to television viewers.

One skilled in the art will appreciate that the present invention can be practiced by other than the described embodiments, which are presented for purposes of illustration and not of limitation, and the present invention is limited only by the claims that follow.

What is claimed is:

1. A method for providing multimedia having one or more multimedia elements by a central multimedia provider to a remote station, the method comprising:
   constructing an implicit schedule from a plurality of prioritized schedules at the central multimedia provider;
   generating control information comprising the implicit schedule, the plurality of prioritized schedules, a set of queries, and characteristic properties of the multimedia;
   storing the multimedia and the control information in a central database at the central multimedia provider; and
   transmitting the multimedia and the control information from the central multimedia provider to the remote station, wherein the remote station:
      processes the set of queries to convert the implicit schedule into an explicit schedule based on the characteristic properties of the multimedia;
      selects a sequence of first and second multimedia elements of the multimedia based on the explicit schedule; and
      generates for display, in one or more promotion screens, the sequence of the first and second multimedia elements of the multimedia,
   wherein the first and the second multimedia elements are each transmitted by the remote station together and are displayed for a period of time such that the second multimedia element is displayed automatically after the first multimedia element has been presented for the period of time, and
   wherein the period of time is determined based on the control information transmitted by the remote station.

2. The method of claim 1, wherein:
   one of the plurality of prioritized schedules comprises a national schedule configured to place national multimedia into the implicit schedule.

3. The method of claim 1, wherein:
   one of the plurality of prioritized schedules comprises a local schedule configured to place local multimedia into the implicit schedule.

4. The method of claim 1, wherein:
   one of the plurality of prioritized schedules comprises a filler schedule configured to fill in spaces in the implicit schedule.

5. The method of claim 1, wherein the remote station further sends a confirmation message to the central media provider when the multimedia and control information are successfully transmitted from the central media provider to the remote station.

6. The method of claim 1, further comprising the step of retransmitting the multimedia and control information from the central media provider to the remote station if an error is detected in the transmitted multimedia and control information.

7. The method of claim 1, wherein the remote station further generates for sequential display first and second videos for the period of time such that the second video is displayed automatically after the first video has been presented for the period of time.

8. A system for providing multimedia having one or more multimedia elements by a central multimedia provider to a remote station, the system comprising:
   control circuitry configured to:
      construct an implicit schedule from a plurality of prioritized schedules at the central multimedia provider;
      generate control information comprising the implicit schedule, the plurality of prioritized schedules, a set of queries, and characteristic properties of the multimedia;
      store the multimedia and the control information in a central database at the central multimedia provider; and
      transmit the multimedia and the control information from the central multimedia provider to the remote station, wherein the remote station:
         processes the set of queries to convert the implicit schedule into an explicit schedule based on the characteristic properties of the multimedia;
         selects a sequence of first and second multimedia elements of the multimedia based on the explicit schedule; and
         generates for display, in one or more promotion screens, the sequence of the first and second multimedia elements of the multimedia,
   wherein the first and second multimedia elements are selected based on the explicit schedule,
   wherein the first and the second multimedia elements are transmitted by the remote station together and are each displayed for a period of time such that the second multimedia element is displayed automatically after the first multimedia element has been presented for the period of time, and wherein the period of time is determined based on the control information transmitted by the remote station.

9. The system of claim 8, wherein:
one of the plurality of prioritized schedules comprises a national schedule configured to place national multimedia into the implicit schedule.

10. The system of claim 8, wherein:
one of the plurality of prioritized schedules comprises a local schedule configured to place local multimedia into the implicit schedule.

11. The system of claim 8, wherein:
one of the plurality of prioritized schedules comprises a filler schedule configured to fill in spaces in the implicit schedule.

12. The system of claim 8, wherein the remote station further:
sends a confirmation message to the central media provider when the multimedia and control information are successfully transmitted from the central media provider to the remote station.

13. The system of claim 8, wherein the control circuitry is further configured to:
retransmit the multimedia and control information from the central media provider to the remote station if an error is detected in the transmitted multimedia and control information.

14. The system of claim 8, wherein the remote station further generates for sequential display first and second videos for the period of time such that the second video is displayed automatically after the first video has been presented for the period of time.

15. A method for providing multimedia having one or more multimedia elements by a central multimedia provider to a remote station, the method comprising:
constructing an implicit schedule from a plurality of prioritized schedules at the central multimedia provider;
generating control information comprising the implicit schedule, the plurality of prioritized schedules, a set of queries, and characteristic properties of the multimedia;
storing the multimedia and the control information in a central database at the central multimedia provider; and
transmitting the multimedia and the control information from the central multimedia provider to the remote station, wherein the remote station: processes the set of queries to convert the implicit schedule into an explicit schedule based on the characteristic properties of the multimedia;
selects a sequence of first and second multimedia elements of the multimedia based on the explicit schedule; and
generates for display, in one or more promotion screens, the sequence of the first and second multimedia elements of the multimedia,
wherein the first and the second multimedia elements are each transmitted by the remote station together and are displayed for a period of time such that the second multimedia element is displayed automatically after the first multimedia element has been presented for the period of time,
wherein the period of time is determined based on the control information transmitted by the remote station, and
wherein the prioritized schedule comprises an interrupt schedule configured to place multimedia at a predetermined frequency into the implicit schedule.

16. The method of claim 15, wherein the remote station further:
sends a confirmation message to the central media provider when the multimedia and control information are successfully transmitted from the central media provider to the remote station.

17. The method of claim 15, further comprising retransmitting the multimedia and control information from the central media provider to the remote station if an error is detected in the transmitted multimedia and control information.

18. The method of claim 15, wherein:
the prioritized schedule comprises a national schedule configured to place national multimedia into the implicit schedule.

19. The method of claim 15, wherein:
the prioritized schedule comprises a local schedule configured to place local multimedia into the implicit schedule.

20. The method of claim 15, wherein:
the prioritized schedule comprises a filler schedule configured to fill in spaces in the implicit schedule.

21. A system for providing multimedia having one or more multimedia elements by a central multimedia provider to a remote station, the system comprising:
control circuitry configured to:
construct an implicit schedule from a plurality of prioritized schedules at the central multimedia provider;
generate control information comprising the implicit schedule, the plurality of prioritized schedules, a set of queries, and characteristic properties of the multimedia;
store the multimedia and the control information in a central database at the central multimedia provider; and
transmit the multimedia and the control information from the central multimedia provider to the remote station, wherein the remote station:
processes the set of queries to convert the implicit schedule into an explicit schedule based on the characteristic properties of the multimedia;
selects a sequence of first and second multimedia elements of the multimedia based on the explicit schedule; and
generates for display, in one or more promotion screens, the sequence of the first and second multimedia elements of the multimedia, wherein the first and second multimedia elements are selected based on the explicit schedule,
wherein the first and the second multimedia elements are each transmitted by the remote station together and are displayed for a period of time such that the second multimedia element is displayed automatically after the first multimedia element has been presented for the period of time,
wherein the period of time is determined based on the control information transmitted by the remote station, and
wherein the prioritized schedule comprises an interrupt schedule configured to place multimedia at a predetermined frequency into the implicit schedule.

22. The system of claim 21, wherein the remote station further:
sends a confirmation message to the central media provider when the multimedia and control information are successfully transmitted from the central media provider to the remote station.

23. The system of claim 21, wherein the control circuitry is further configured to:

retransmit the multimedia and the control information from the central media provider to the remote station if an error is detected in the transmitted multimedia and control information.

24. The system of claim 21, wherein:
the prioritized schedule comprises a national schedule configured to place national multimedia into the implicit schedule.

25. The system of claim 21, wherein:
the prioritized schedule comprises a local schedule configured to place local multimedia into the implicit schedule.

26. The system of claim 21, wherein:
the prioritized schedule comprises a filler schedule configured to fill in spaces in the implicit schedule.

* * * * *